United States Patent
Takagi

(10) Patent No.: US 9,427,870 B2
(45) Date of Patent: Aug. 30, 2016

(54) ROBOTICS APPARATUS, ROBOT CONTROL METHOD, PROGRAM, AND RECORDING MEDIUM

(71) Applicant: CANON KABUSHIKI KAISHA, Tokyo (JP)

(72) Inventor: Kiyoshi Takagi, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 105 days.

(21) Appl. No.: 14/212,842

(22) Filed: Mar. 14, 2014

(65) Prior Publication Data
US 2014/0288703 A1 Sep. 25, 2014

(30) Foreign Application Priority Data
Mar. 25, 2013 (JP) ................. 2013-061607

(51) Int. Cl.
*G06F 19/00* (2011.01)
*B25J 9/16* (2006.01)
(52) U.S. Cl.
CPC ..... *B25J 9/1633* (2013.01); *G05B 2219/39201* (2013.01); *G05B 2219/39329* (2013.01); *Y10S 901/02* (2013.01)
(58) Field of Classification Search
CPC .......... B25J 9/16; B25J 9/1075; B25J 9/1633; B25J 9/1641; B25J 9/1635; G05B 2219/39201; G05B 2219/39452; G05B 2219/39454; Y10S 901/01; Y10S 901/02; Y10S 901/09
USPC ................................. 700/245–264
See application file for complete search history.

(56) References Cited

U.S. PATENT DOCUMENTS

| | | | | |
|---|---|---|---|---|
| 5,648,709 A | * | 7/1997 | Maeda | ............... G05B 17/02 318/568.1 |
| 7,385,686 B2 | | 6/2008 | Shiba et al. | |

(Continued)

FOREIGN PATENT DOCUMENTS

JP 2012-86354 A 5/2012

OTHER PUBLICATIONS

Mechanical Properties of Robot Arm Operated with Muscle Coordinate System Consisted of Bi-articular Muscles and Mono-articular Muscles, by Toru Oshima, Tomohiro Fujikawa, and Minayori Kumamoto, Journal of the Japan Society of Precision Engineering, vol. 66, No. 1, pp. 141 to 146, Jan. 1, 2000.

(Continued)

*Primary Examiner* — Rachid Bendidi
(74) *Attorney, Agent, or Firm* — Fitzpatrick, Cella, Harper & Scinto

(57) ABSTRACT

The robotics apparatus includes an $f_1$-actuator for driving a first link, an $f_2$-actuator for driving a second link, an actuator for simultaneously driving both links, and a CPU for controlling those actuators. The CPU sets a driving-force command value to an $e_3$-actuator to a predetermined set value. Moreover, the CPU calculates a driving-force command value to the $f_1$-actuator based on the driving-force command value and a target joint angle for a first joint. The CPU calculates a driving-force command value to the $f_2$-actuator and a target joint angle for a second joint. It achieves a control for allowing a distal end of a second link to track a target trajectory and stiffness control at the distal end of the second link with a smaller number of driving sources than that of a conventional 3-pair 6-muscle manipulator.

15 Claims, 15 Drawing Sheets

(56) References Cited

U.S. PATENT DOCUMENTS

| | | | | |
|---|---|---|---|---|
| 2008/0041153 A1* | 2/2008 | Tokita | ............... | A63B 23/12 73/379.01 |
| 2008/0288107 A1* | 11/2008 | Tokita | ............... | A61H 1/0237 700/245 |
| 2008/0312049 A1* | 12/2008 | Ido | ............... | A61H 3/00 482/66 |
| 2010/0010639 A1* | 1/2010 | Ikeuchi | ............... | A61H 3/008 623/24 |
| 2010/0050765 A1* | 3/2010 | Kadota | ............... | A61B 5/1071 73/379.01 |
| 2011/0218676 A1* | 9/2011 | Okazaki | ............... | B25J 9/1075 700/260 |
| 2012/0072025 A1 | 3/2012 | Takagi et al. | | |
| 2012/0072026 A1* | 3/2012 | Takagi | ............... | B25J 9/1075 700/261 |
| 2013/0211595 A1 | 8/2013 | Takagi | | |
| 2013/0211596 A1* | 8/2013 | Takagi | ............... | B25J 9/1633 700/261 |
| 2013/0345877 A1 | 12/2013 | Kose et al. | | |

OTHER PUBLICATIONS

Motor Development of an Pneumatic Musculoskeletal Infant Robot, by Kenichi Narioka and Koh Hosoda, 2011, IEEE International Conference on Robotics and Automation, pp. 963 to 968, May 9, 2011.

* cited by examiner

ROBOTICS APPARATUS, ROBOT CONTROL METHOD, PROGRAM, AND RECORDING MEDIUM

BACKGROUND OF THE INVENTION

1. Field of the Invention

The present invention relates to a robotics apparatus including a control unit for controlling a first driving source for driving a first link, a second driving source for driving a second link, and a third driving source for driving both the first link and the second link, and to a robot control method, a program, and a recording medium.

2. Description of the Related Art

In a method for controlling a manipulator, it becomes more and more important for a hand tip to be able to flexibly come into contact with an object. If the flexible contact of the hand tip with the object is applied to industrial robots, collaborative work between a human and a robot is realized, or component fitting work is facilitated by controlling a direction of flexibility of the hand tip.

If the flexible contact described above is applied to leg-walking type mobile robots, legs can softly come into contact with a ground surface to reduce a shock applied on a trunk, or the robot can stably walk on an irregular terrain by absorbing a level difference.

In order to realize the control of flexibility of the hand tip, impedance control using a force sensor mounted on the hand tip, or control using an artificial muscle actuator is performed. It is known that a human muscle is an actuator as well as a control mechanism having a variable viscoelasticity. Among the artificial muscle actuators, in particular, a pneumatic rubber artificial muscle actuator as represented by a McKibben artificial muscle actuator has viscoelastic properties similar to those of the muscles. Therefore, by controlling softness of the artificial muscle actuator provided to the manipulator, the hand tip can come into contact with the object with arbitrary flexibility.

In the document, "Mechanical Properties of Robot Arm Operated with Muscle Coordinate System Consisted of Bi-articular Muscles and Mono-articular Muscles, by Toru Oshima, Tomohiro Fujikawa, and Minayori Kumamoto, Journal of the Japan Society of Precision Engineering, Vol. 66, No. 1, pp. 141 to 146", it is proposed, that a 3-pair 6-muscle manipulator including a bi-articular simultaneous driving actuator for simultaneously driving a first link and a second link in addition to artificial muscle actuators for respectively driving the first link and the second link. Oshima et. al teaches features in the following stiffness properties. Specifically, when elasticities of the artificial muscle actuators are set equal to each other, a direction of an external force applied onto the hand tip and a direction of movement become the same in the case where the external force is applied to the hand tip on a line connecting a first joint and the hand tip. It is difficult to use the McKibben actuator for motion control because the McKibben actuator has nonlinearity in viscoelastic properties and control is required to be performed with antagonistic arrangement.

On the other hand, Japanese Patent Application Laid-Open No. 2012-86354 teaches that a simple feedback control system using saturation of a control input is derived to control a joint angle in addition of stiffness control for the hand tip in a simultaneous manner. However, the 3-pair 6-muscle manipulator requires six driving sources to be provided. Therefore, for example, when the McKibben artificial muscle actuator is used, a mechanical configuration including a control valve becomes complex.

On the other hand, in "Motor Development of an Pneumatic Musculoskeletal Infant Robot, by Kenichi Narioka and Koh Hosoda, 2011, IEEE International Conference on Robotics and Automation, pp. 963 to 968, 2011", artificial muscle actuators are used for lower limbs of an infant robot. By acquiring a contractile-force command value by learning, a crawling motion is realized. In Narioka et. al, one actuator is provided to each joint in a direction of folding the first link and the second link with respect to the manipulator, whereas a single bi-articular simultaneous driving actuator is provided to unfold the two links.

In Narioka et. al, a learning control system is configured based on neural oscillators to acquire the contractile-force command value for realizing the crawling motion by linking motions of upper limbs and motions of the lower limbs.

In Narioka et. al, the realization of the crawling motion by a fullbody motion of the infant robot is considered, but positioning control or compliance control by the manipulator alone is not considered. Moreover, the learning control requires time to generate the control input. Therefore, it is difficult to apply the learning control to purposes of use in which a target trajectory frequently changes.

SUMMARY OF THE INVENTION

The present invention provides a robotics apparatus capable of controlling a distal end of a second link to track a target trajectory and performing stiffness control at the distal end of the second link with a smaller number of driving sources than that of a conventional 3-pair 6-muscle manipulator, a robot control method, a program, and a recording medium.

A purpose of the invention is to provide a robotics apparatus, including a first link pivotably connected at a first joint with regard to a base portion, a second link pivotably connected at a second joint with regard to the first link, a first driving source for driving the first link about the first joint, a second driving source for driving the second link about the second joint, a third driving source for simultaneously driving the first link about the first joint and the second link about the second joint, and a control unit for respectively controlling driving forces of the first driving source, a driving force of the second driving source and a driving force of the third driving source, based on a first driving-force command value for the first driving source, a second driving-force command value for the second driving source, and a third driving-force command value for the third driving source.

Another purpose of the invention is to provide, a robot control method of controlling a robotics apparatus including generating, by the control unit, a first target joint angle for the first joint and a second target joint angle for the second joint based on a target trajectory of a distal end of the second link, setting, by the control unit, the third driving-force command value to a predetermined setting value, calculating, by the control unit, the first driving-force command value based on the third driving-force command value and the first target joint angle, and calculating, by the control unit, the second driving-force command value based on the third driving-force command value and the second target joint angle.

A further purpose of the invention is to provide a computer program executes steps of generating, by the control unit, a first target joint angle for the first joint and a second target joint angle for the second joint based on a target trajectory of a distal end of the second link, setting, by the control unit, the third driving-force command value to a predetermined setting value, calculating, by the control unit, the first driving-force command value based on the third driving-force command value and the first target joint angle; and calculating, by the control unit, the second driving-force command value based on the third driving-force command value and the second target joint angle.

A still further purpose of the invention is to provide a computer-readable recording medium including a computer program that executes steps of generating, by the control unit, a first target joint angle for the first joint and a second target joint angle for the second joint based on a target trajectory of a distal end of the second link, setting, by the control unit, the third driving-force command value to a predetermined setting value, calculating, by the control unit, the first driving-force command value based on the third driving-force command value and the first target joint angle; and calculating, by the control unit, the second driving-force command value based on the third driving-force command value and the second target joint angle.

A still further features of the present invention will become apparent from the following description of exemplary embodiments with reference to the attached drawings.

DESCRIPTION OF THE EMBODIMENTS

Figure 1:
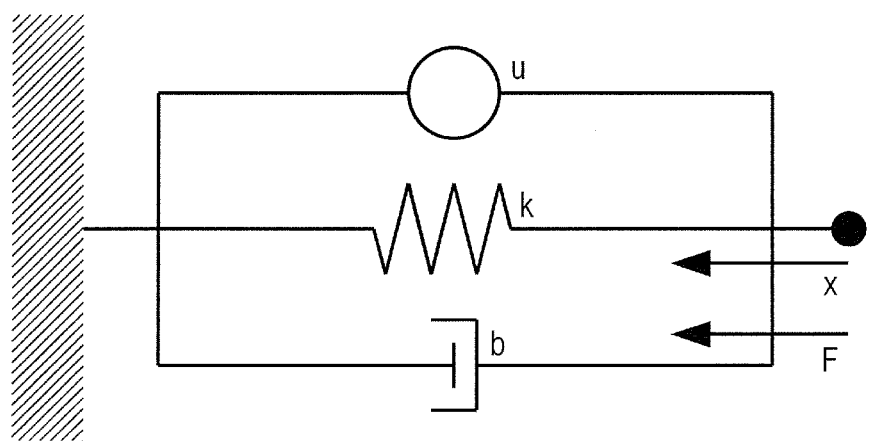
FIG. 1 is a diagram illustrating a viscoelasticity model of a muscle according to a first embodiment of the present invention.

Now, embodiments for carrying out the present invention are described in detail referring to the drawings.

First Embodiment (1) Modeling

In a first embodiment of the present invention, control of a manipulator using pneumatic artificial muscle actuators is performed. The artificial muscle actuator is an actuator having a property similar to a muscle property called "viscoelasticity". A muscle is modeled by using a force-generating element, an elastic element, and a viscous element, as illustrated in FIG. 1.

In FIG. 1, u is a contractile force of the force-generating element, and x is a contraction amount of the muscle when a contraction direction is regarded as positive. A contraction speed is expressed by the following formula:

$$\dot{x}$$

Moreover, k is an elastic-force constant, b is a viscous-force constant, and F is a muscle contractile force. Then, the viscoelastic property of the muscle is modeled as expressed by:

$$F = u - kux - bu\dot{x} \tag{1}$$

The elastic force and the viscous force of the muscle contractile force have a feature in having a non-linear element proportional to the contractile force u of the force-generating element.

Figure 2:
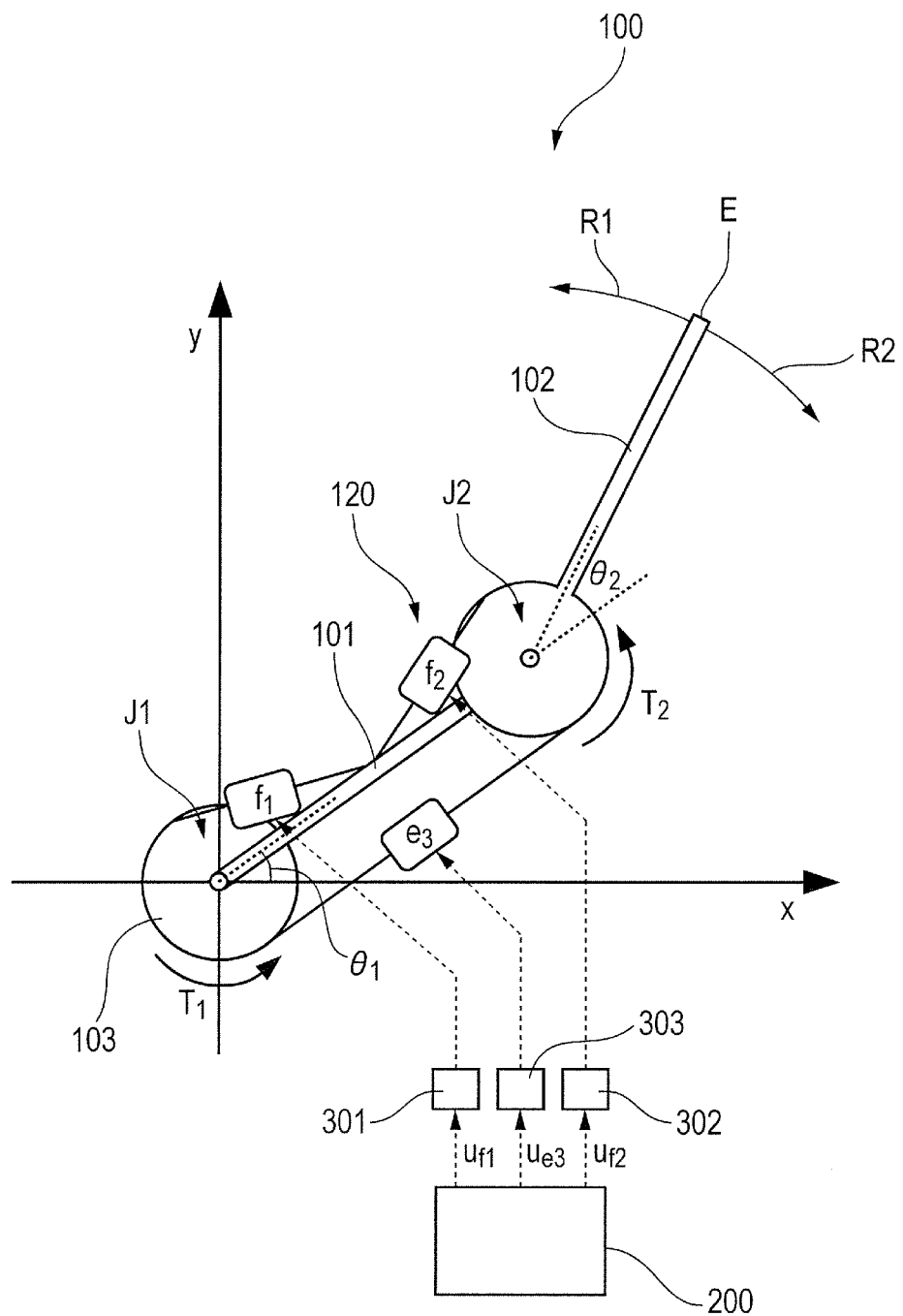
FIG. 2 is a schematic view illustrating a robotics apparatus according to the first embodiment.

Next, a robotics apparatus according to the first embodiment is illustrated in FIG. 2. A robotics apparatus 100 illustrated in FIG. 2 is a so-called two-link manipulator (hereinafter referred to simply as "manipulator") 120. The manipulator 120 includes a link 101 which is a first link, a link 102 which is a second link, an actuator $f_1$ which is a first driving source, an actuator $f_2$ which is a second driving source, and an actuator $e_3$ which is a third driving source.

A base end of the link 101 is pivotably connected at a joint J1 which is a first joint with regard to a base portion 103. A base end of the link 102 is pivotably connected at a joint J2 which is a second joint with regard to a distal end of the link 101.

The actuator $f_1$ drives the link 101 about the joint J1, whereas the actuator $f_2$ drives the link 102 about the joint J2. Specifically, each of the actuators $f_1$ and $f_2$ is a mono-articular driving actuator for driving a single link.

The actuator $e_3$ simultaneously drives the links 101 and 102 respectively about the joints J1 and J2. The actuator $e_3$ is a bi-articular simultaneous driving actuator for simultaneously driving the two links.

In this embodiment, each of the actuators $f_1$, $f_2$, and $e_3$ is a pneumatic artificial muscle actuator, and generates only a contractile force (tensile force) as a driving force. Therefore, the actuator $f_1$ drives the link 101 about the joint J1 in a pivot direction R1 which is a first pivot direction, whereas the actuator $f_2$ drives the link 102 about the joint J2 in the pivot direction R1. The actuator $e_3$ drives both the links 101 and 102 respectively about the joints J1 and J2 in a pivot direction R2 which is a second pivot direction opposite to the pivot direction R1.

It is known that bi-articular simultaneous driving actuators called "bi-articular muscles" exist in brachial regions and lower-limb thigh regions of a human. Muscular arrangements in human four limbs are complex. However, the concept of effective muscles is introduced, and Oshima et. al discloses a two-link model having 3-pair 6-muscles. Although the 3-pair 6-muscle arrangement realizes biologically-inspired control such as output-direction control, the number of actuators becomes three times as large as that of a serial-link robot which is widely put into practical use for industrial applications.

Therefore, in this embodiment, the manipulator 120 includes the two mono-articular driving actuators, that is, the actuators $f_1$ and $f_2$, and the single bi-articular driving actuator, that is, the actuator $e_3$, to thereby drive the two links 101 and 102.

The arrangement of the actuators $f_1$, $f_2$, and $e_3$ described above is referred to as "3-muscle antagonistic arrangement" in this embodiment. Here, $u_{f1}$, $u_{f2}$, and $u_{e3}$ are contractile forces of the force-generating elements, $k_{f1}$, $k_{f2}$, and $k_{e3}$ are elastic-force constants of the artificial muscle actuators, and $b_{f1}$, $b_{f2}$, and $b_{e3}$ are viscous constants of the artificial muscle actuators. A pivot angle of the link 101 with regard to the base portion 103, that is, a joint angle of the joint J1 (first joint angle) is regarded as $\theta_1$, and a pivot angle of the link 102 with regard to the link 101, that is, a joint angle of the joint J2 (second joint angle) is regarded as $\theta_2$.

Inertia moments of the links 101 and 101 are respectively regarded as $I_1$ and $I_2$, lengths of the links 101 and 102 in a longitudinal direction are respectively regarded as $l_1$ and $l_2$, masses of the links 101 and 102 are respectively regarded as $m_1$ and $m_2$, and a moment arm diameter for both the links 101 and 102 is regarded as r. In this embodiment, the elastic-force constant and the viscous-force constant are respectively regarded as k and b for each muscle. Then, motion equations are:

$$(m_1 l_1^2 + l_1 + 4m_2 l_1^2 + 4m_2 l_1 l_2 \cos\theta_2 + m_2 l_2^2 + l_2)\ddot{\theta}_1 + \qquad (2)$$
$$(m_2 l_2^2 + l_2 + 2m_2 l_1 l_2 \cos\theta_2)\ddot{\theta}_2 - 2m_2 l_1 l_2 (2\dot{\theta}_1 + \dot{\theta}_2)\sin\theta_2 \dot{\theta}_2 =$$
$$u_{f1} r - u_{f1} kr^2 \theta_1 - u_{f1} br^2 \dot{\theta}_1 - u_{e3} r - u_{e3} kr^2 (\theta_1 + \theta_2) -$$
$$u_{e3} br^2 (\dot{\theta}_1 + \dot{\theta}_2) = (u_{f1} - u_{e3})r - (u_{f1} + u_{e3}) kr^2 \theta_1 -$$
$$(u_{f1} + u_{e3}) br^2 \dot{\theta}_1 - u_{e3} kr^2 \theta_2 - u_{e3} br^2 \dot{\theta}_2$$

$$(m_2 l_2^2 + l_2 + 2m_2 l_1 l_2 \cos\theta_2)\ddot{\theta}_1 + (m_2 l_2^2 + l_2)\ddot{\theta}_2 + 2m_2 l_1 l_2 \sin\theta_2 \dot{\theta}_1^2 = \qquad (3)$$
$$u_{f2} r - u_{f2} kr^2 \theta_2 - u_{f2} br^2 \dot{\theta}_2 - u_{e3} r - u_{e3} kr^2 (\theta_1 + \theta_2) -$$
$$u_{e3} br^2 (\dot{\theta}_1 + \dot{\theta}_2) = (u_{f2} + u_{e3})r - (u_{f2} + u_{e3}) kr^2 \theta_2 -$$
$$(u_{f2} + u_{e3}) br^2 \dot{\theta}_2 - u_{e3} kr^2 \theta_1 - u_{e3} br^2 \dot{\theta}_1$$

It is understood that a difference between the generated forces (driving forces, that is, contractile forces) $u_{f1}$ and $u_{e3}$ in the first term on the right-hand side of Formula (2) applies a rotation torque to the joint J1 and the sum of the generated forces $u_{f1}$ and $u_{e3}$ in the second and third terms on the right-hand side varies the stiffness and the viscosity with regard to the joint J1. Similarly, it is understood that a difference between the generated forces $u_{f2}$ and $u_{e3}$ in the first term on the right-hand side of Formula (3) applies a rotation torque to the joint J2 and the sum of the generated forces $u_{f2}$ and $u_{e3}$ in the second and third terms on the right-hand side varies the stiffness and the viscosity with regard to the joint J2.

(2) Control System

The robotics apparatus 100 includes a control device 200, and three drivers 301, 302, and 303. The three drivers 301, 302, and 303 respectively drive the actuators $f_1$, $f_2$, and $e_3$ based on the driving-force command values (that is, contractile-force command values) $u_{f1}$, $u_{f2}$, and $u_{e3}$ from the control device 200. The control device 200 generates the driving-force command values $u_{f1}$, $u_{f2}$, and $u_{e3}$ (first driving-force command value $u_{f1}$, second driving-force command value $u_{f2}$, and third driving-force command value $u_{e3}$) respectively corresponding to the actuators $f_1$, $f_2$, and $e_3$. Then, the control device 200 outputs the driving-force command values $u_{f1}$, $u_{f2}$, and $u_{e3}$ respectively to the drivers 301, 302, and 303 to control the driving forces of the respective actuators $f_1$, $f_2$, and $e_3$.

For each of the drivers 301, 302, and 303, the driving source is a pneumatic artificial muscle actuator. Therefore, the drivers 301, 302, and 303 are configured to include a pipe constituting an air path for feeding air respectively to the actuators $f_1$, $f_2$, and $e_3$ and a control valve under the driving-force command values $u_{f1}$, $u_{f2}$, and $u_{e3}$ from the control device 200.

Figure 3:
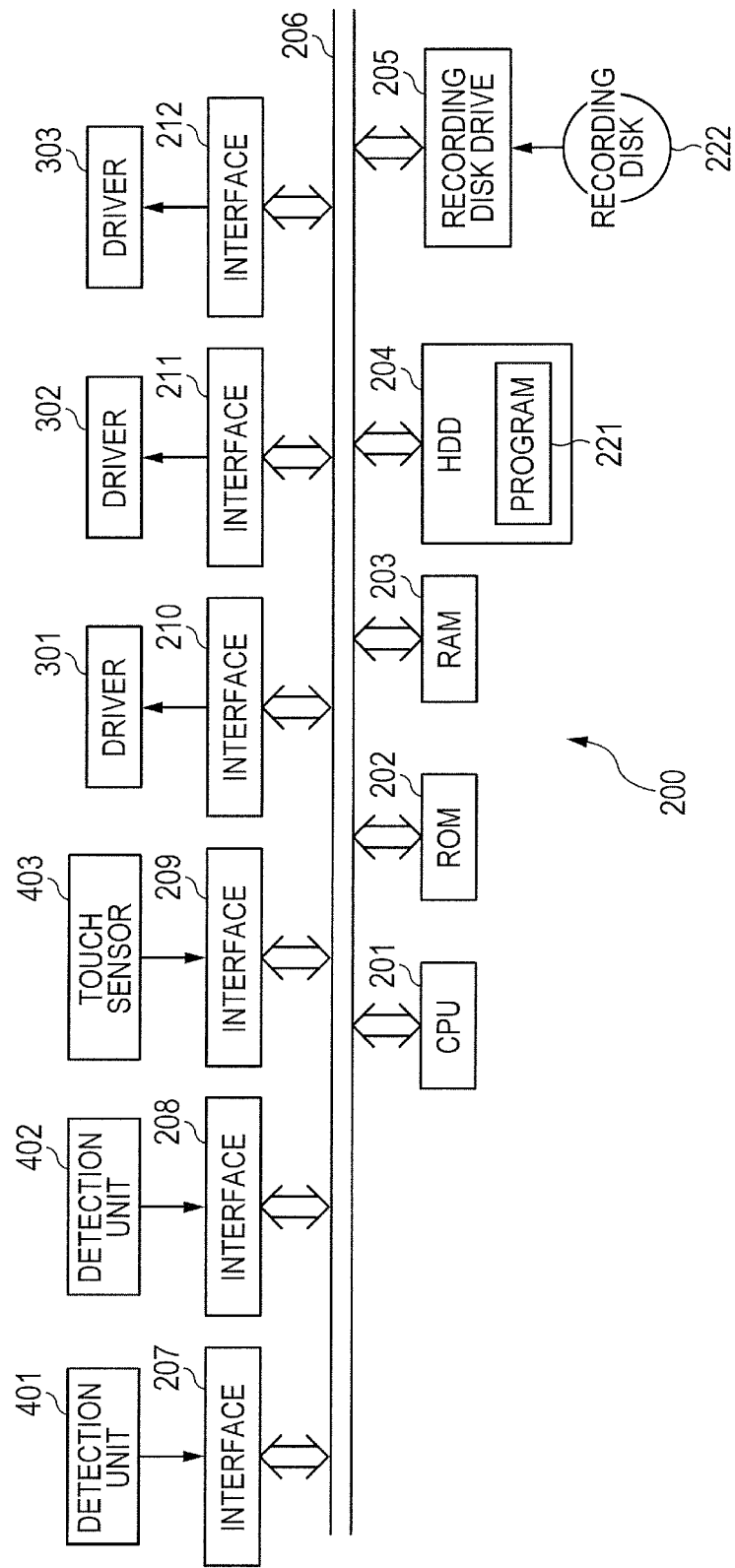
FIG. 3 is a block diagram illustrating a configuration of a control device according to the first embodiment.

Now, prior to the description of an operation of the control device 200, a device configuration of the control device 200 is first described. FIG. 3 is a block diagram illustrating a configuration of the control device 200.

The control device 200 is configured with a computer, and includes a central processing unit (CPU) 201 as a control unit (calculation unit). The control device 200 also includes a read only memory (ROM) 202 and a random access memory (RAM) 203. The control device 200 further includes a hard disk drive (HDD) 204, a recording disk drive 205, and various interfaces 207 to 212.

The ROM 202, the RAM 203, the HDD 204, the recording disk drive 205, and the various interfaces 207 to 212 are connected to the CPU 201 through a bus 206. Basic programs such as a BIOS are stored in the ROM 202. The RAM 203 is a storage device for temporarily storing the result of calculation processing by the CPU 201.

The HDD 204 is a storage unit for storing various types of data which are the results of calculation processing performed by the CPU 201 as well as a recording medium for recording a program 221 for controlling the CPU 201 to execute various types of calculation processing described later. The CPU 201 executes the various types of calculation processing based on the program 221 recorded on the HDD 204.

The recording disk drive 205 can read out various types of data and programs recorded on the recording disk 222.

The drives 301, 302, and 303 described above are respectively connected to the interfaces 210, 211, and 212. The CPU 201 outputs the driving-force command values $u_{f1}$, $u_{f2}$, and $u_{e3}$ respectively to the drivers 301, 302, and 303 through the bus 206 and the interfaces 210, 211, and 212. The drivers 301, 302, and 303 control the actuators $f_e$, $f_2$, and $e_3$ to generate the driving forces corresponding to the driving-force command values $u_{f1}$, $u_{f2}$, and $u_{e3}$.

In this embodiment, the robotics apparatus 100 includes a detection unit 401 which is a first detection unit, a detection unit 402 which is a second detection unit, and a touch sensor 403, which are not shown in FIG. 2. The detection unit 401 is disposed at the joint J1 in FIG. 2 to detect the joint angle $\theta_1$ of the joint J1. In the following, the joint angle detected by the detection unit 401 is referred to as "detected joint angle (first detected joint angle) $\theta_1$." The detection unit 402 is disposed at the joint J2 in FIG. 2 to detect the joint angle $\theta_2$ of the joint J2. In the following, the joint angle detected by the detection unit 402 is referred to as "detected joint angle (second detected joint angle) $\theta_2$." The touch sensor 403 is provided to one of the links 101 and 102 to detect whether or not an object has come into contact with one of the links 101 and 102.

The detection unit 401 is connected to the interface 207. A signal indicating the detected joint angle $\theta_1$ is transmitted to the CPU 201 through the interface 207 and the bus 206. The detection unit 402 is connected to the interface 208. A signal indicating the detected joint angle $\theta_2$ is transmitted to the CPU 201 through the interface 208 and the bus 206. The touch sensor 403 is connected to the interface 209. A signal indicating whether or not an object has come into contact therewith is transmitted to the CPU 201 through the interface 209 and the bus 206.

Figure 4:
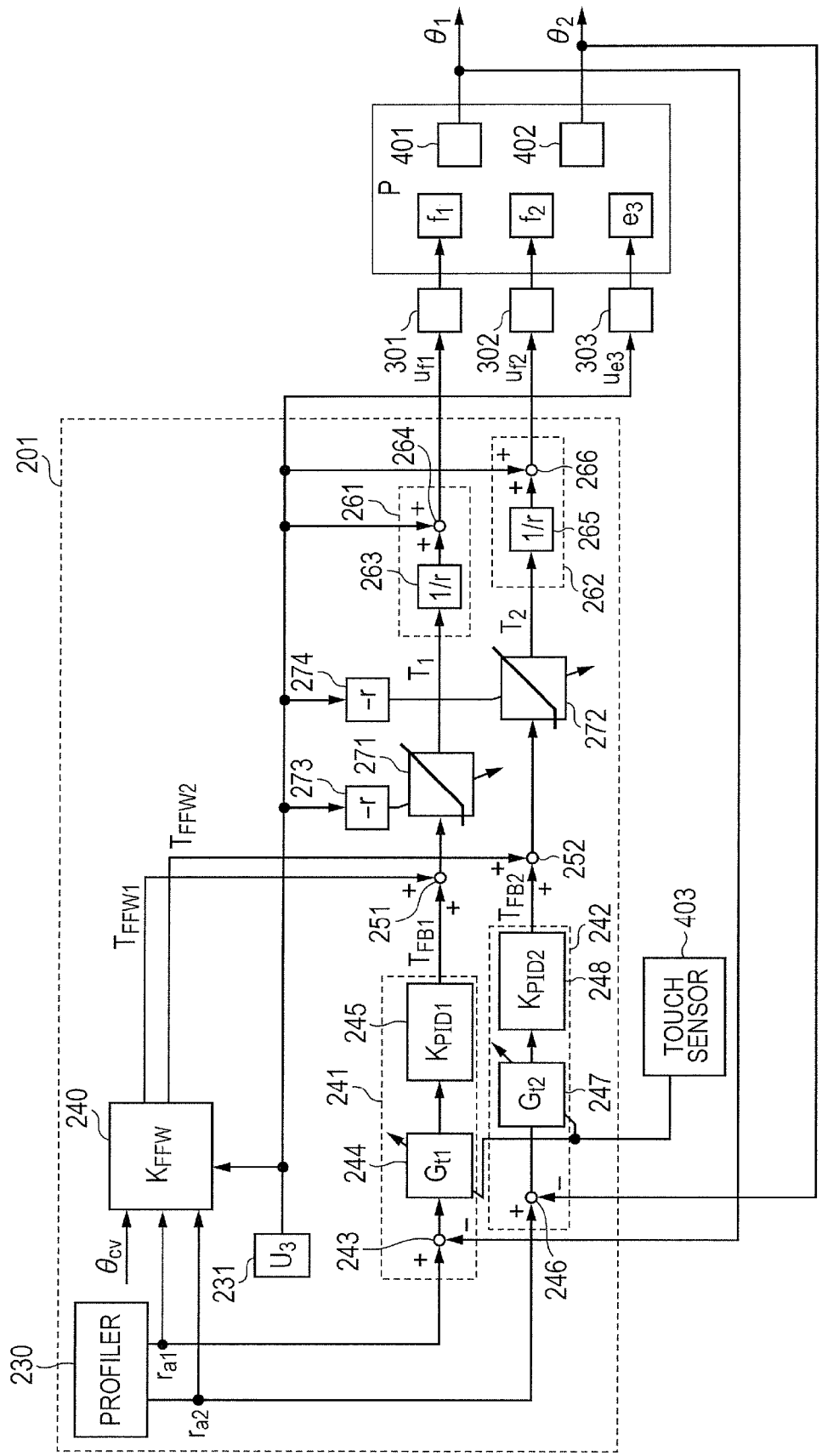
FIG. 4 is a functional block diagram illustrating a control operation of a CPU according to the first embodiment.

FIG. 4 is a functional block diagram illustrating a control operation of the CPU 201. A robot control method is now described referring to FIG. 4. In FIG. 4, the manipulator 120 is denoted by the reference symbol P. The CPU (control unit)

201 of the control device 200 executes the program 221 read out from the HDD 204 to function as each of units illustrated in FIG. 4.

Specifically, the CPU 201 functions as a target joint-angle generation processing unit 230, a setting processing unit 231, and a feedforward calculation processing unit 240. The CPU 201 also functions as a feedback calculation processing unit 241 which is a first feedback calculation processing unit and a feedback calculation processing unit 242 which is a second feedback calculation processing unit. The CPU 201 further functions as a torque command-value calculation processing unit 251 which is a first torque command-value calculation processing unit and a torque command-value calculation processing unit 252 which is a second torque command-value calculation processing unit. The CPU 201 further functions as a driving-force command value calculation processing unit 261 which is a first driving-force command value calculation processing unit and a driving-force command value calculation processing unit 262 which is a second driving-force command value calculation processing unit. The CPU 201 also functions as a constraint processing unit 271 which is a first constraint processing unit and a constraint processing unit 272 which is a second constraint processing unit.

In this embodiment, the CPU 201 functions as each of the units described above to control the three actuators $f_1$, $f_2$, and $e_3$. In this manner, the rotation torque is applied to each of the joints J1 and J2 to perform the control so as to vary the stiffness of a distal end (that is, hand tip) E of the second link 102. In this embodiment, the CPU 201 functions as each of the units described above to set a target trajectory for the joint angle. By generating a joint torque so as to track the target trajectory, trajectory tracking control is performed.

Specifically, the target joint-angle generation processing unit 230 executes target joint-angle generation processing for generating a target joint angle (first target joint angle) $r_{a1}$ for the joint J1 and a target joint angle (second target joint angle) $r_{a2}$ for the joint J2 based on the target trajectory of the hand tip E (target joint-angle generation step). Data of the target trajectory of the hand tip E is stored in, for example, the HDD 204, and is read out from the HDD 204 by the CPU 201.

Now, control input torques (torque command values) to the joints J1 and J2 to allow the hand tip E to track the target trajectory are respectively regarded as $T_1$ and $T_2$.

$$(u_{f1} - u_{e3})r = T_1 \quad (4)$$

$$(u_{f2} - u_{e3})r = T_2 \quad (5)$$

The driving-force command values $u_{f1}$, $u_{f2}$, and $u_{e3}$ only need to be determined so as to satisfy Formulas (4) and (5). However, unique solutions cannot be obtained thereby. Therefore, in this embodiment, the setting processing unit 231 executes setting processing for setting the driving-force command value $u_{e3}$ for the actuator $e_3$ to a predetermined (for example, constant) set value $U_3$ (setting step).

The driving-force command value calculation processing unit 261 executes first driving-force command value calculation processing for calculating the driving-force command value $u_{f1}$ based on the driving-force command value $U_3$ and the target joint angle $r_{a1}$ (first driving-force command value calculation step). The driving-force command value calculation processing unit 262 executes second driving-force command value calculation processing for calculating the driving-force command value $u_{f2}$ based on the driving-force command value $U_3$ and the target joint angle $r_{a2}$ (second driving-force command value calculation step).

By the above-mentioned processing, the driving-force command values $u_{f1}$ and $u_{f2}$ for the mono-articular driving actuators $f_1$ and $f_2$ can be determined. If the driving-force command value $U_3$ for the bi-articular driving actuator $e_3$ is increased, the driving-force command values $u_{f1}$ and $u_{f2}$ for the mono-articular driving actuators $f_1$ and $f_2$ are required to be increased so that the manipulator 120 maintains a constant posture. According to Formula (1), the elastic coefficient k of the actuators $f_1$, $f_2$, and $e_3$ is proportional to the driving-force command values $u_{f1}$, $u_{f2}$, and $u_{e3}$. Therefore, the stiffness of the manipulator 120 (that is, the hand tip E) is increased.

As described above, by the 3-muscle antagonistic arrangement, the target trajectory tracking control and the stiffness control can be performed. In this embodiment, the tracking control to the target trajectory is performed by a two-degrees-of-freedom control system obtained by combining a feedforward control system and a feedback control system. Further, a technique for analyzing and controlling the stiffness properties of the hand tip E in the 3-muscle antagonistic arrangement is described.

(2.1) Two-Degrees-of-Freedom Control System

Feedback control systems for the respective links 101 and 102 are the feedback calculation processing units 241 and 242. The feedback calculation processing unit 241 obtains a feedback control torque (first correction-torque command value) $T_{FB1}$ for the joint J1 by a feedback calculation based on a difference between the detected joint angle $\theta_{e1}$ and the target joint angle $r_{a1}$. Specifically, the feedback calculation processing unit 241 executes first feedback calculation processing for obtaining the feedback control torque $T_{FB1}$ (first feedback calculation step). The feedback calculation processing unit 242 obtains a feedback control torque (second correction-torque command value) $T_{FB2}$ for the joint J2 by a feedback calculation based on a difference between the detected joint angle $\theta_2$ and the target joint angle $r_{a2}$. Specifically, the feedback calculation processing unit 242 executes second feedback calculation processing for obtaining the feedback control torque $T_{FB2}$ (second feedback calculation step).

More specifically, the feedback calculation processing unit 241 includes a difference calculation processing unit 243, a gain adjusting unit 244, and a PID control unit 245. The difference calculation processing unit 243 calculates a difference $(\theta_1 - r_{a1})$ between the detected joint angle $\theta_1$ and the target joint angle $r_{a1}$. The gain adjusting unit 244 sets the gain to 0 when the contact is detected by the touch sensor 403 and to 1 when the contact is not detected. The PID control unit 245 calculates the feedback control torque $T_{FB1}$ for compensating for the difference $(\theta_1 - r_{a1})$ based on a transfer function $K_{PID1}$.

Similarly, the feedback calculation processing unit 242 includes a difference calculation processing unit 246, a gain adjusting unit 247, and a PID control unit 248. The difference calculation processing unit 246 calculates a difference $(\theta_1 - r_{a2})$ between the detected joint angle $\theta_2$ and the target joint angle $r_{a2}$. The gain adjusting unit 247 sets the gain to 0 when the contact is detected by the touch sensor 403 and to 1 when the contact is not detected. The PID control unit 248 calculates the feedback control torque $T_{FB2}$ for compensating for the difference $(\theta_2 - r_{a2})$ based on a transfer function $K_{PID2}$.

The feedforward control system is the feedforward calculation processing unit 240. The feedforward calculation processing unit 240 uses the driving-force command value $U_3$ and the target joint angle $r_{a1}$ to obtain a feedforward control torque (temporary first torque command value) $T_{FFW1}$ for the join J1 by a feedforward calculation. Specifically, the feedforward calculation processing unit 240 executes first feedforward calculation processing for obtaining the feedforward control torque $T_{FFW1}$ (first feedforward calculation step).

Similarly, the feedforward calculation processing unit 240 uses the driving-force command value $U_3$ and the target joint angle $r_{a2}$ to obtain a feedforward control torque (temporary second torque command value) $T_{FFW2}$ for the join J2 by a feedforward calculation. Specifically, the feedforward calculation processing unit 240 executes second feedforward calculation processing for obtaining the feedforward control torque $T_{FFW2}$ (second feedforward calculation step).

Here, by Formulas (4) and (5), $$(u_{f1} - u_{e3})r = T_{FFW1} + T_{FB1} = T_1 \quad (6)$$

$$(u_{f2} - u_{e3})r = T_{FFW2} + T_{FB2} = T_2 \quad (7)$$

If the driving-force command values $u_{f1}$, $u_{f2}$, and $u_{e3}$ are determined to satisfy Formulas (6) and (7), sums (first torque command value $T_1$ and second torque command value $T_2$) of the torques of the feedback control system and the feedforward control system can be given respectively to the joints J1 and J2. Accordingly, in order to obtain the driving-force command values $u_{f1}$, $u_{f2}$, and $u_{e3}$ from the torque command values $T_1$ and $T_2$, Formulas (6) and (7) only need to be solved for the driving-force command values $u_{f1}$ and $u_{f2}$ to determine $$u_{f1} = T_1/r + U_3, \quad u_{f2} = T_2/r + U_3 \quad (8)$$

Specifically, the driving-force command value calculation processing unit 261 only needs to calculate $T_1/r + U_3$ as the driving-force command value $u_{f1}$, whereas the driving-force command value calculation processing unit 262 only needs to calculate $T_2/r + U_3$ as the driving-force command value $u_{f2}$. More specifically, the driving-force command value calculation processing unit 261 includes a multiplication unit 263 for multiplying $T_1$ by 1/r and an addition unit 264 for adding $U_3$ to a calculation result $T_1/r$ of the multiplication unit 263. The driving-force command value calculation processing unit 262 includes a multiplication unit 265 for multiplying $T_2$ by 1/r and an addition unit 266 for adding $U_3$ to a calculation result $T_2/r$ of the multiplication unit 265.

Here, in the first embodiment, the actuators $f_1$ and $f_2$ generate the force only in the contraction direction,
the conditions:

$$u_{f1} > 0, \quad u_{f2} > 0 \quad (9)$$

are required to be satisfied simultaneously. By Formulas (8) and (9), when the torque command values $T_1$ and $T_2$ satisfy constraint conditions:

$$T_1 > -rU_3, \quad T_2 > -rU_3 \quad (10)$$

the manipulator 120 is positioned at the target joint angles $r_{a1}$ and $r_{a2}$ by the torque command values $T_1$ and $T_2$.

A detailed description is now given. First, $T_1 > -r \times U_3$ is set as a first constraint condition, and $T_2 > -r \times U_3$ is set as a second constraint condition. In this embodiment, the CPU 201 which is the control unit functions as a calculation processing unit 273 for calculating $-r \times U_3$ and a calculation processing unit 274 for calculating $-r \times U_3$.

When the torque command value $T_1$ does not satisfy the first constraint condition based on the calculation result of the calculation processing unit 273, the constraint processing unit 271 corrects the torque command value $T_1$ so as to satisfy the first constraint condition. Then, the constraint processing unit 271 executes first constraint processing to set the result of correction as the new torque command value $T_1$ (first constraint step). Similarly, when the torque command value $T_2$ does not satisfy the second constraint condition based on the calculation result of the calculation processing unit 274, the constraint processing unit 272 corrects the torque command value $T_2$ so as to satisfy the second constraint condition. Then, the constraint processing unit 272 executes second constraint processing to set the result of correction as the new torque command value $T_2$ (second constraint step). By the constraint operations described above, the manipulator 120 is positioned at the target joint angles $r_{a1}$ and $r_{a2}$ by the torque command values $T_1$ and $T_2$ for the respective joints J1 and J2.

(2.2) Feedback Control Systems

As described above, the stiffness of the manipulator 120 (that is, the hand tip E) can be varied by using the driving-force command value $U_3$ for the bi-articular simultaneous driving actuator $e_3$. However, when the gains of the feedback control systems are large, the stiffness of the joints based on the gains of the feedback control systems becomes disadvantageously dominant.

Therefore, as illustrated in FIG. 4, contact gains $G_{f1}$ and $G_{f2}$ are introduced. When the contact occurs, the feedback systems are interrupted by setting $G_{f1} = 0$ and $G_{f2} = 0$. Specifically, when the touch sensor 403 determines that an object has come into contact with one of the links 101 and 102, the CPU 201 regards the differences $(\theta_1 - r_{a1})$ and $(\theta_2 - r_{a2})$ as 0 and sets the feedback control torque $T_{FB1}$ and the feedback control torque $T_{FB2}$ to 0.

As a result, at arbitrary time, for example, time at which the contact of the hand tip E with a human or an object is detected, the stiffness of the manipulator 120 (hand tip E) can be quickly switched to the stiffness based on the elastic elements of the actuators $f_1$, $f_2$, and $e_3$.

In this embodiment, the transfer functions of the PID control units 245 and 248 are set as expressed by:

$$K_{PID1}(s) = \left(280 + \frac{15}{s} + \frac{10s}{1/(100 \cdot 2 \cdot \pi)s \, 1}\right) \quad (11)$$

$$K_{PID2}(s) = \left(250 + \frac{10}{s} + \frac{1s}{1/(100 \cdot 2 \cdot \pi)s \, 1}\right) \quad (12)$$

(2.3) Feedforward Control Systems

First, Formulas (2) and (3) are rewritten as follows.

$$f_1(\theta_1, \dot{\theta}_1, \ddot{\theta}_1, \theta_2, \dot{\theta}_2, \ddot{\theta}_2) = u_{f1} r(1 - kr\theta_1 - br\dot{\theta}_1) - u_{e3} r(1 + kr(\theta_1 + \theta_2) + br(\dot{\theta}_1 + \dot{\theta}_2)) \quad (13)$$

$$f_2(\theta_1, \dot{\theta}_1, \ddot{\theta}_1, \theta_2, \dot{\theta}_2, \ddot{\theta}_2) = u_{f2} r(1 - kr\theta_2 - br\dot{\theta}_2) - u_{e3} r(1 + kr(\theta_1 + \theta_2) + br(\dot{\theta}_1 + \dot{\theta}_2)) \quad (14)$$

Based on the inverse dynamics, feedforward control inputs (temporary first driving-force command value and temporary second driving-force command value) $u_{Ff1}$ and $u_{Ff2}$ which are necessary for the detected joint angles $\theta_1$ and $\theta_2$ to track the target joint angles $r_{a1}$ and $r_{a2}$ are obtained as:

$$u_{Ff1} = \frac{f_1(r_{a1}, \dot{r}_{a1}, \ddot{r}_{a1}, r_{a2}, \dot{r}_{a2}, \ddot{r}_{a2}) + U_3 r(1 + kr(r_{a1} + r_{a2}) + br(\dot{r}_{a1} + \dot{r}_{a2}))}{r\{1 - krr_{a1} - br\dot{r}_{a1}\}} \quad (15)$$

$$u_{Ff2} = \frac{f_2(r_{a1}, \dot{r}_{a1}, \ddot{r}_{a1}, r_{a2}, \dot{r}_{a2}, \ddot{r}_{a2}) + U_3 r(1 + kr(r_{a1} + r_{a2}) + br(\dot{r}_{a1} + \dot{r}_{a2}))}{r\{1 - krr_{a2} - br\dot{r}_{a2}\}} \quad (16)$$

Specifically, the feedforward calculation processing unit 240 calculates the feedforward control inputs $u_{Ff1}$ and $u_{Ff2}$ based on the inverse dynamics.

For the two-degrees-of-freedom control illustrated in FIG. 4, the feedforward control inputs $u_{Ff1}$ and $u_{Ff2}$ are required to be converted into the feedforward control torques $T_{FFW1}$ and $T_{FFW2}$ for the joints. For the conversion, $$T_{FFW1} = (u_{Ff1} - U_3)r \quad (17)$$

$$T_{FFW2} = (u_{Ff2} - U_3)r \quad (18)$$

only need to be satisfied. Specifically, the feedforward calculation processing unit 240 calculates the feedforward control torque $T_{FFW1}$ by a calculation formula: $T_{FFW1} = (u_{Ff1} - U_3) \times r$ and the feedforward control torque $T_{FFW2}$ by a calculation formula: $T_{FFW2} = (u_{Ff2} - U_3) \times r$.

When at least one of the feedforward control inputs $u_{Ff1}$ and $u_{Ff2}$ becomes negative, a recalculation is required to be performed after the set value $U_3$ is increased. Specifically, when at least one of the feedforward control inputs $u_{Ff1}$ and $u_{Ff2}$ becomes negative, the feedforward calculation processing unit 240 adds a positive value to the set value $U_3$ of the driving-force command value $u_{e3}$. Then, the feedforward calculation processing unit 240 recalculates the feedforward control torques $T_{FFW1}$ and $T_{FFW2}$. Alternatively, reaching time at the target trajectory may be changed to reduce an acceleration.

For the derivation described above, it is supposed that the elastic forces of the actuators $f_1$, $f_2$, and $e_3$ are generated proportional to angles from $\theta_1 = 0$ and $\theta_2 = 0$ [deg]. In order to generate the feedforward control inputs with arbitrary angles as angles serving as references of generation of the elastic forces of the actuators $f_1$, $f_2$, and $e_3$ (hereinafter referred to as "neutral posture angles"), when $\theta_{c1}$ and $\theta_{c2}$ are the neutral posture angles, the feedforward control inputs are obtained by satisfying instead of Formulas (15) and (16):

$$u_{Ff1} = \frac{f_1(r_{a1}, \dot{r}_{a1}, \ddot{r}_{a1}, r_{a2}, \dot{r}_{a2}, \ddot{r}_{a2}) + U_3 r(1 + kr((r_{a1} - \theta_{c1}) + (r_{a2} - \theta_{c2})) + br(\dot{r}_{a1} + \dot{r}_{a2}))}{r\{1 - kr(r_{a1} - \theta_{c1}) - br\dot{r}_{a1}\}} \quad (19)$$

$$u_{Ff2} = \frac{f_2(r_{a1}, \dot{r}_{a1}, \ddot{r}_{a1}, r_{a2}, \dot{r}_{a2}, \ddot{r}_{a2}) + U_3 r(1 + kr((r_{a1} - \theta_{c1}) + (r_{a2} - \theta_{c2})) + br(\dot{r}_{a1} + \dot{r}_{a2}))}{r\{1 - kr(r_{a2} - \theta_{c1}) - br\dot{r}_{a2}\}} \quad (20)$$

(2.4) Hand Tip Stiffness Control

Figure 5:
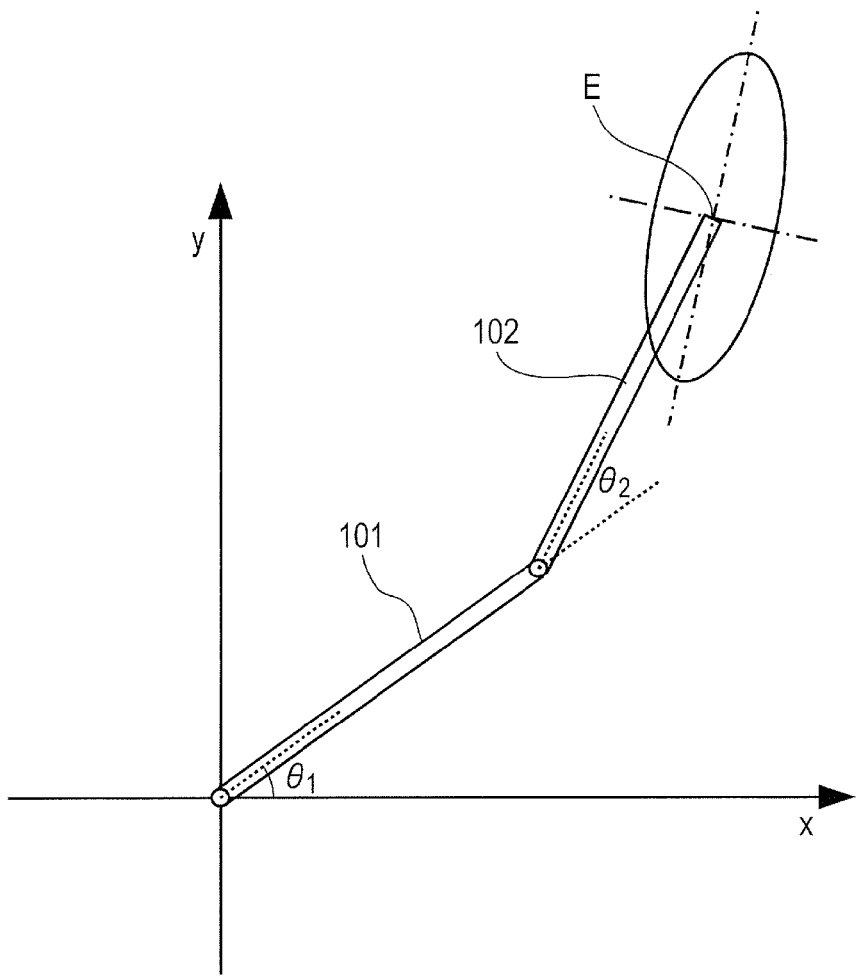
FIG. 5 is a graph showing a stiffness ellipse according to the first embodiment.

In the case of the two-link manipulator 120, the hand tip E directly comes into contact with the external world. Therefore, it is important to control the stiffness of the hand tip E. The stiffness of the hand tip E is expressed by a stiffness ellipse as shown in FIG. 5. The ellipse represents a distribution of the stiffness in each direction, and indicates that the stiffness becomes higher as a distance between the hand tip E and the ellipse becomes longer.

In the case of the two-link manipulator having the 3-pair 6-muscles described in Oshima et. al, the stiffness of the hand tip is obtained by controlling the sums of the contractile forces of the antagonistic pairs. For example, when the sums of the contractile forces of the respective antagonistic pairs are all set equal to each other, an axis of the stiffness ellipse is oriented in a direction which connects the first joint and the hand tip. However, the 3-muscle antagonistic arrangement used in this embodiment, the stiffness ellipse is determined by the neutral posture angles which correspond to an initial posture and a target posture. This is because, by setting the muscle command to the bi-articular simultaneous driving actuator to $U_3$, the driving-force command values $u_{f1}$ and $u_{f2}$ for stabilization to the target posture are uniquely determined as:

$$u_{f1} = \frac{U_3 r(1 + kr((r_{a1} - \theta_{c1}) + (r_{a2} - \theta_{c2})))}{r\{1 - kr(r_{a1} - \theta_{c1})\}} \quad (21)$$

$$u_{f2} = \frac{U_3 r(1 + kr((r_{a1} - \theta_{c1}) + (r_{a2} - \theta_{c2})))}{r\{1 - kr(r_{a2} - \theta_{c1})\}} \quad (22)$$

Figure 6:
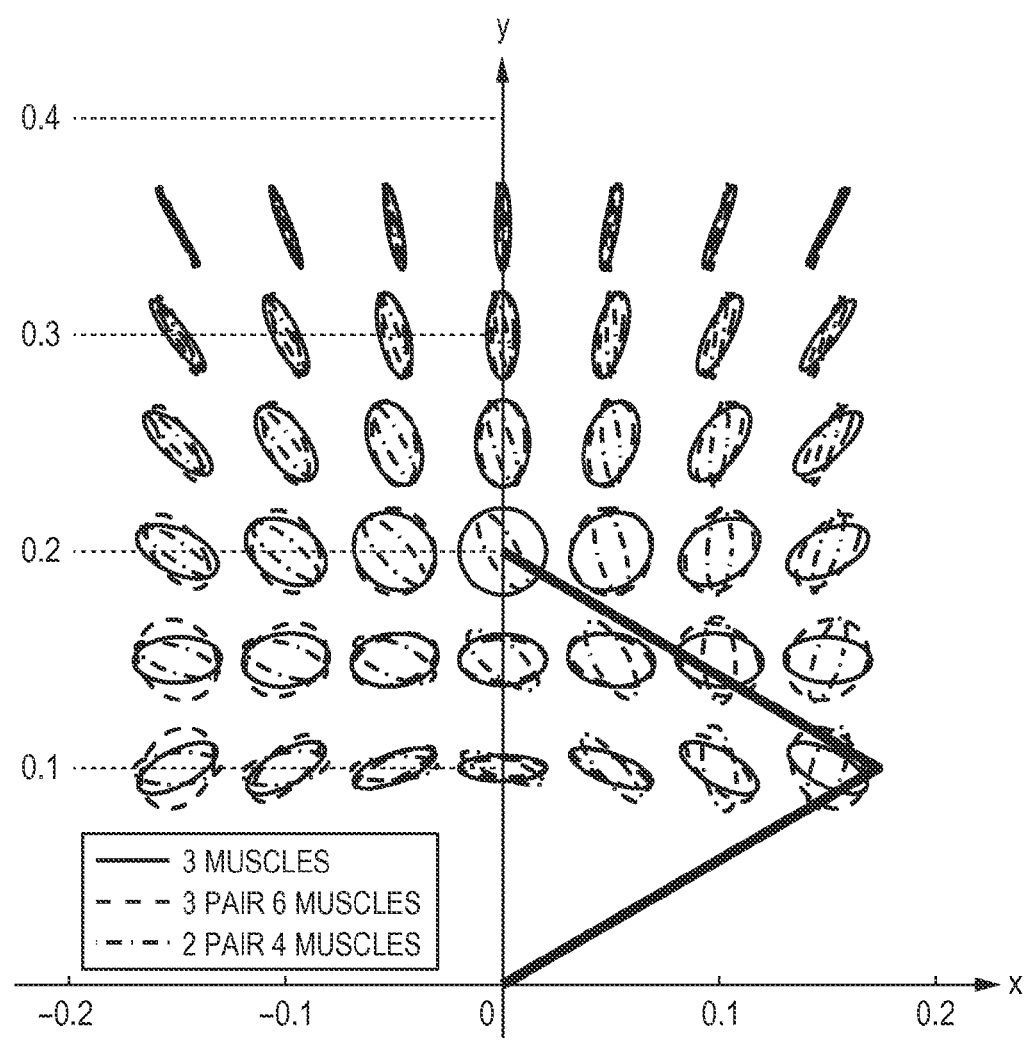
FIG. 6 is a graph showing the result of a simulation according to the first embodiment.

In FIG. 6, the hand tip stiffness ellipses when the hand tip E reaches points on an x-y plane are indicated by the solid line with the neutral posture angles $\theta_{c1}$ and $\theta_{c2}$ being 30 [deg] and 120 [deg]. For comparison, stiffness ellipses obtained by setting all the sums of the contractile forces of the antagonistic pairs in a 3-pair 6-muscle manipulator to be equal to each other are indicated by the broken line, and stiffness ellipses in a 2-pair 4-muscle arrangement in which each pair of muscles is provided to each joint without using a bi-articular muscle are indicated by the alternate long and short dash line.

First, focusing on a y axis, in the 3-muscle antagonistic arrangement and the 3-pair 6-muscle arrangement, axes of the stiffness ellipses are respectively parallel to the x axis and the y axis. It implies that, in a case where a disturbance is applied to the hand tip E in the x-axis direction and the y-axis direction, the hand tip E is displaced in the same direction as that of the disturbance.

In the 2-pair 4-muscle arrangement, however, the axes of the stiffness ellipses are inclined with respect to the x axis and the y axis. In response to the disturbance applied in the x-axis direction, the hand tip E displaces away from the x axis. By the above-mentioned fact, in a case where the hand tip E is located on the y axis, it is understood that compliance control based on the viscoelasticity of the muscles is achieved in the 3-muscle antagonistic arrangement and the 3-pair 6-muscle arrangement.

Next, focusing on positions other than on the y axis, in the 3-pair 6-muscle arrangement, the axes of the stiffness ellipses are always oriented toward the hand tip E and the point of origin. The 3-pair 6-muscle arrangement has a good compliance property that the hand tip E is displaced in the same direction as that of the disturbance in response to the disturbance in the direction described above.

In the case of the manipulator 120 having the 3-muscle antagonistic arrangement of this embodiment, the axes of the stiffness ellipses are oriented in approximately the same directions are those of the 3-pair 6-muscle arrangement, in particular, within the range of the hand tip±0.1 [m] from the initial posture.

In the case of the 2-pair 4-muscle arrangement, however, the stiffness ellipses greatly differ from each other. From the above-mentioned fact, the 3-muscles arrangement has a compliance property similar to that of the 3-pair 6-muscle arrangement owing to the effects of the bi-articular muscle.

Further, by changing the neutral posture angles with respect to the same target posture, the inclination of the stiffness ellipse at the hand tip position which is a target position can be controlled.

Figure 7:
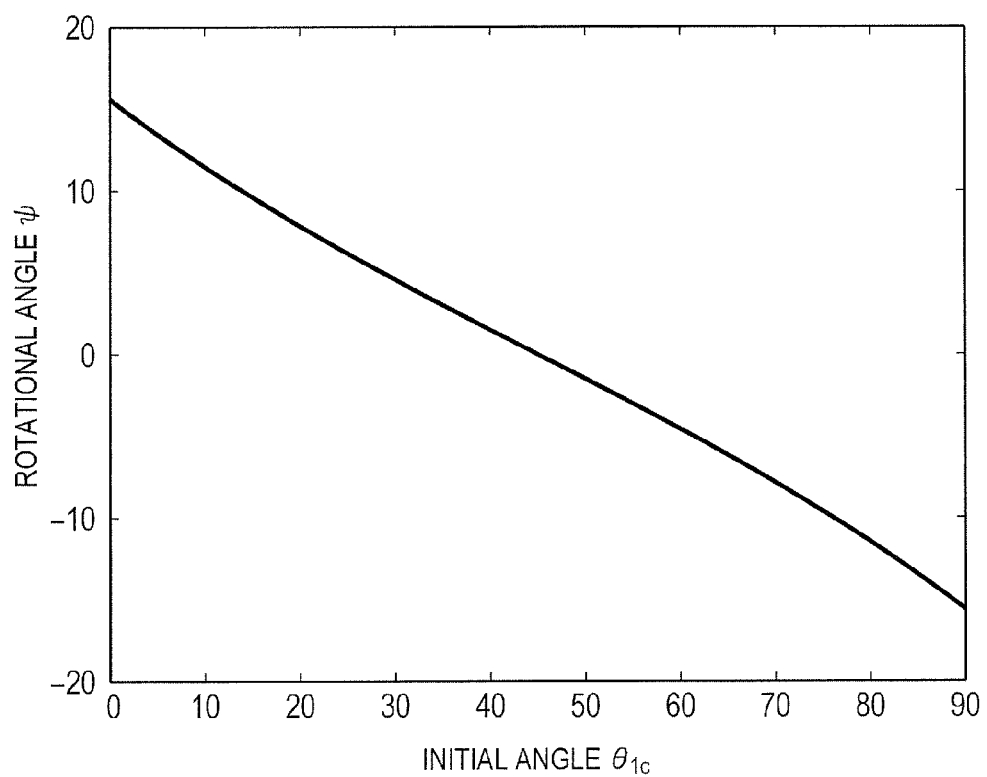
FIG. 7 is a graph showing the result of a simulation according to the first embodiment.

FIG. 7 shows a calculation example where the inclination of the stiffness ellipse of the hand tip E at the target joint angle from the x axis is varied from 15 [deg] to −15 [deg] with the target postures being set to 45 [deg] and 90 [deg].

In FIG. 7, positioning control to realize the target joint angle is performed while varying the neutral posture angle $\theta_{c1}$ from 0 [deg] to 90 [deg] and setting the neutral posture angle $\theta_{c2}$ to a constant value of 90 [deg]. From FIG. 7, when the neutral posture angle $\theta_{c1}$ is 45 [deg] which is equal to the target posture, the inclination of the stiffness ellipse is 90 [deg]. Therefore, as in the case of FIG. 6, the axes of the ellipse are parallel to the x axis and the y axis. By changing the neutral posture angle and performing the positioning control, however, different stiffness properties of the hand tip can be obtained even with the same target posture of the manipulator. For example, in order to control the axes of the stiffness ellipses to be inclined at 10 [deg] from the x axis and the y axis in the target posture, the neutral posture angle $\theta_{c1}$ needs to be set to about 13 [deg] by referring to FIG. 7. Then, the positioning control only needs to be performed to realize the target posture.

(2.5) Trajectory Design

In this embodiment, the target trajectory is set so that the hand tip E is driven on the y axis in a positive direction. Further, it is assumed that the target trajectory has an acceleration section, a constant-speed section, and a deceleration section. The target joint angles $r_{a1}$ and $r_{a2}$ for the joint angles $\theta_1$ and $\theta_2$ are obtained from the trajectory of the hand tip based on the inverse dynamics.

Next, the target stiffness is set so as to be high in the acceleration/deceleration sections and to be low in the constant-speed section. Specifically, the driving-force command value (contractile-force command value) $u_{e3}$ for the bi-articular simultaneous driving actuator $e_3$ in the acceleration/deceleration sections is regarded as $U_{3max}$ and the driving-force command value (contractile-force command value) $u_{e3}$ for the bi-articular simultaneous driving actuator $e_3$ in the constant-speed zone is regarded as $U_{3min}$. In this embodiment, the trajectory having the acceleration section, the constant-speed section, and the deceleration section is used. However, a trajectory without the constant-speed section, for example, a minimum-jerk trajectory may be used. Moreover, if drive efficiency is not taken into consideration, the target stiffness may be set constant.

(3) Simulation

A simulation using the control system described in the preceding section is performed. It is assumed that physical parameters of the links 101 and 102 are the same. It is assumed that a length of each of the links 101 and 102 is 0.2 [m], inertia moments of the links 101 and 102 are $I_1=I_2=1.3 \times 10^{-3}$ [kgm²], a diameter of the moment arm is 0.05 [m], and the elasticity and the viscous constant are k=12 and b=0.003, respectively. For the target trajectory, start time $t_a$ of the constant-speed section=0.2747 [seconds], finish time $t_b$ of the constant-speed section=0.4746 [seconds], and positioning finish time $t_{fin}$=0.75 [seconds]. Moreover, it is assumed that the neutral posture angles $\theta_{c1}$ and $\theta_{c2}$ by the elastic forces when the joint torques $T_1$ and $T_2$ do not act are joint angles at an intermediate point on the hand tip trajectory, and $\theta_{c1}$=29.7 [deg] and $\theta_{c2}$=120.7 [deg]. The driving-force command value (contractile-force command value) $u_{e3}$ for the artificial muscle actuator $e_3$ is expressed by:

$$U_{3max}=3, U_{3min}=1$$

Further, in this embodiment, in order to examine an identification error of a model of the two-degrees-of-freedom control system, it is assumed that the inertia moments are $I_1$ and $I_2$ in the generation of the feedforward inputs. In the simulation, however, the inertia moments of the links 101 and 102 are set as $I_1'=1.2I_1$ and $I_2'=1.2I_2$.

Figure 8A:
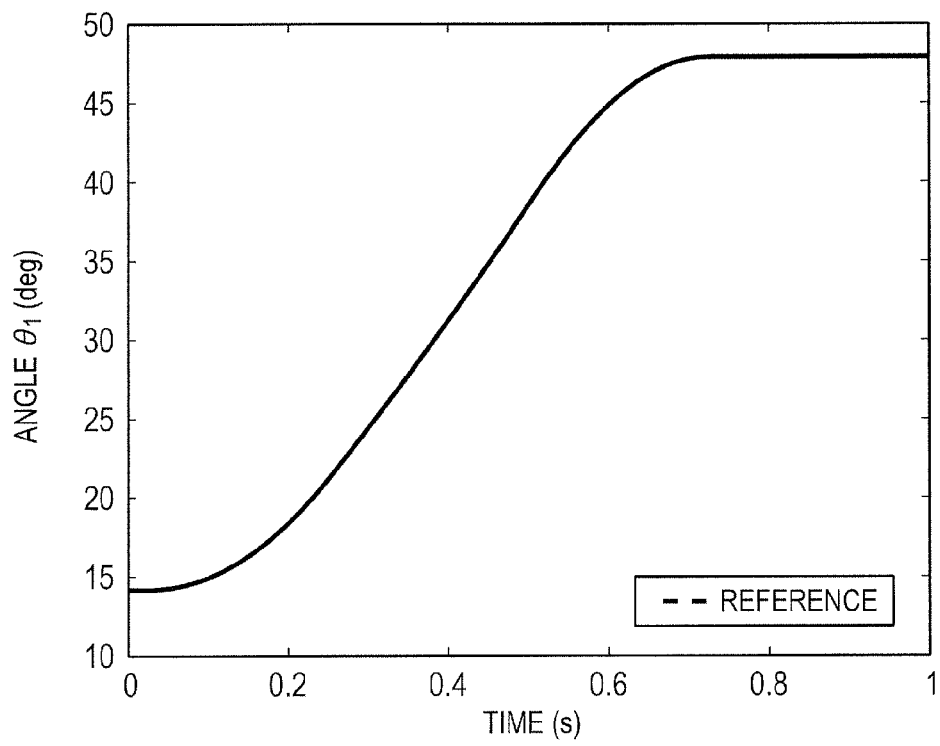
FIGS. 8A and 8B are graphs showing the result of a simulation according to the first embodiment.
Figure 8B:
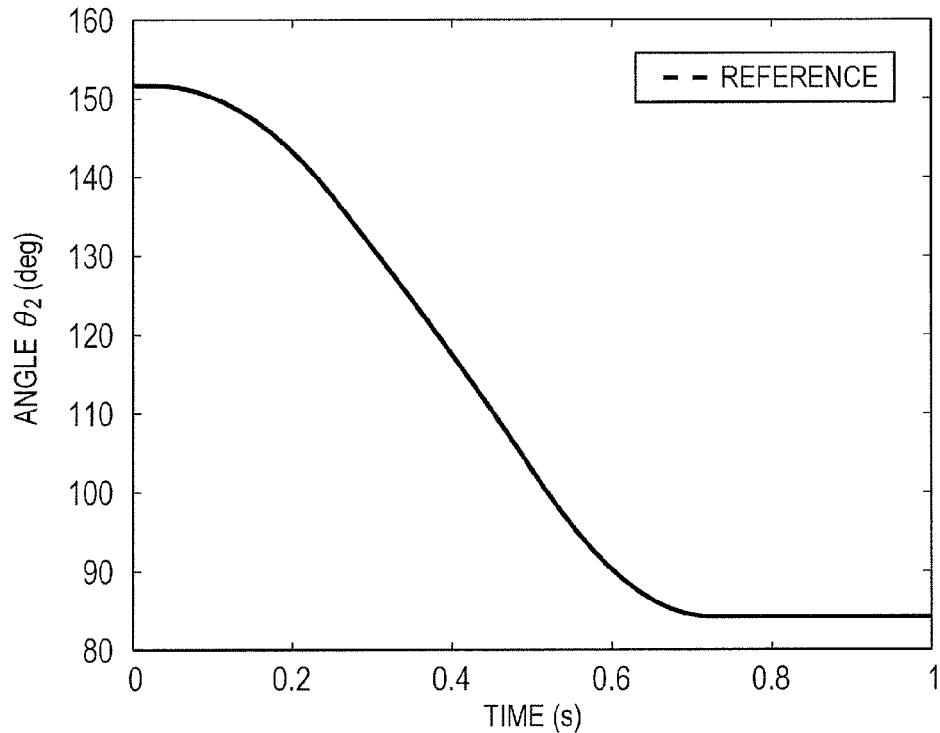
Figure 9:
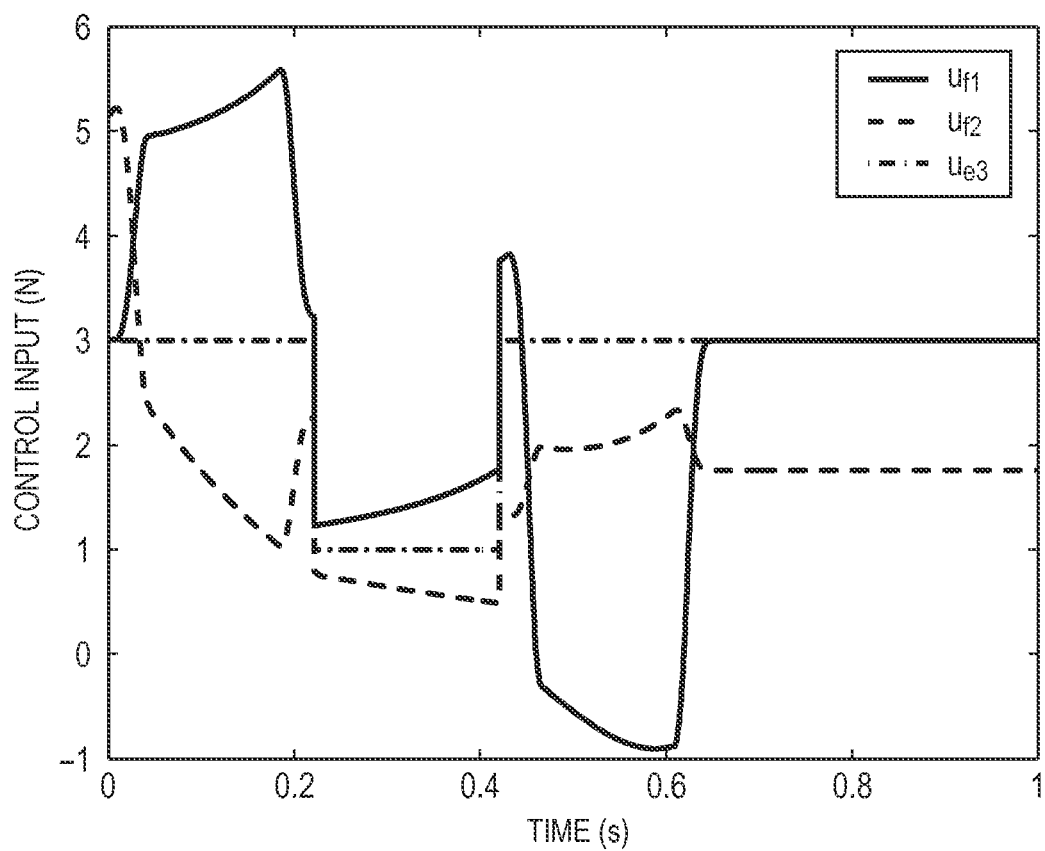
FIG. 9 is a graph showing the result of a simulation according to the first embodiment.
Figure 10A:
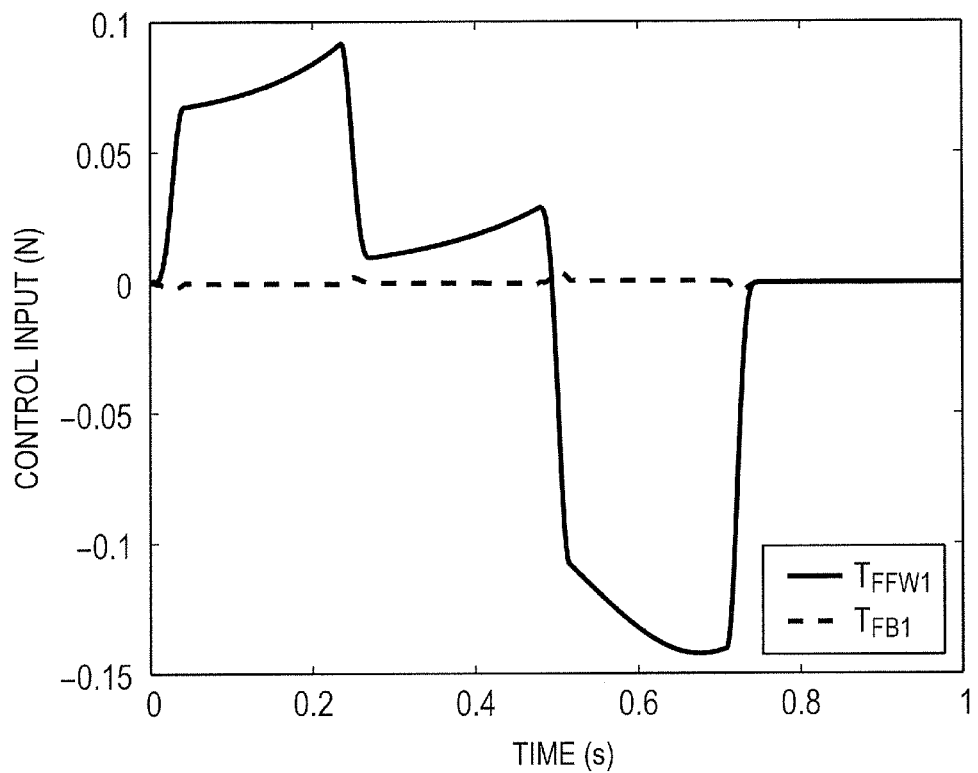
FIGS. 10A and 10B are graphs showing the results of a simulation according to the first embodiment.
Figure 10B:
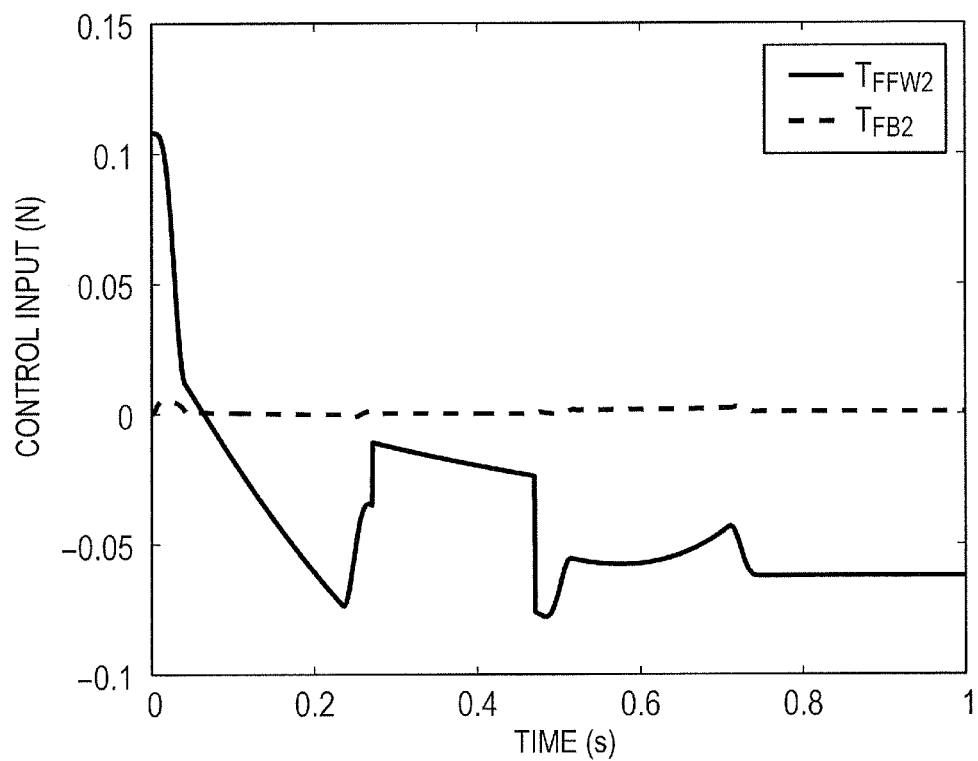

In FIGS. 8A and 8B, the detected joint angles $\theta_1$ and $\theta_2$ of the links 101 and 120 are indicated by the solid lines, and the target joint angles $r_{a1}$ and $r_{a2}$ are indicated by the broken lines. In FIG. 9, responses to the driving-force command values $u_{f1}$, $u_{f2}$, and $u_{e3}$ are respectively indicated by the solid line, the broken line, and the alternate long and short dash line. FIG. 10A shows $T_{FFW1}$ and $T_{FB1}$ respectively in solid line and broken line, and FIG. 10B shows $T_{FFW2}$ and $T_{FB2}$ respectively in solid and broken line.

The detected joint angles $\theta_1$ and $\theta_2$ indicated by the solid lines overlap the target joint angles $r_{a1}$ and $r_{a2}$ indicated by the broken lines. Therefore, from FIGS. 8A and 8B, it is understood that the links 101 and 102, that is, the hand tip E tracks the target trajectory. This is because the feedback control inputs compensate for the model error as indicated by the broken lines in FIGS. 10A and 10B. From FIG. 9, the driving-force command values $u_{f1}$ and $u_{f2}$ convert the control inputs $T_1$ and $T_2$ of the two-degrees-of-freedom control system under the conditions expressed by Formulas (10) and (8). Therefore, it is understood that the property that the contractile force of the artificial muscle has a positive value is satisfied.

Figure 11A:
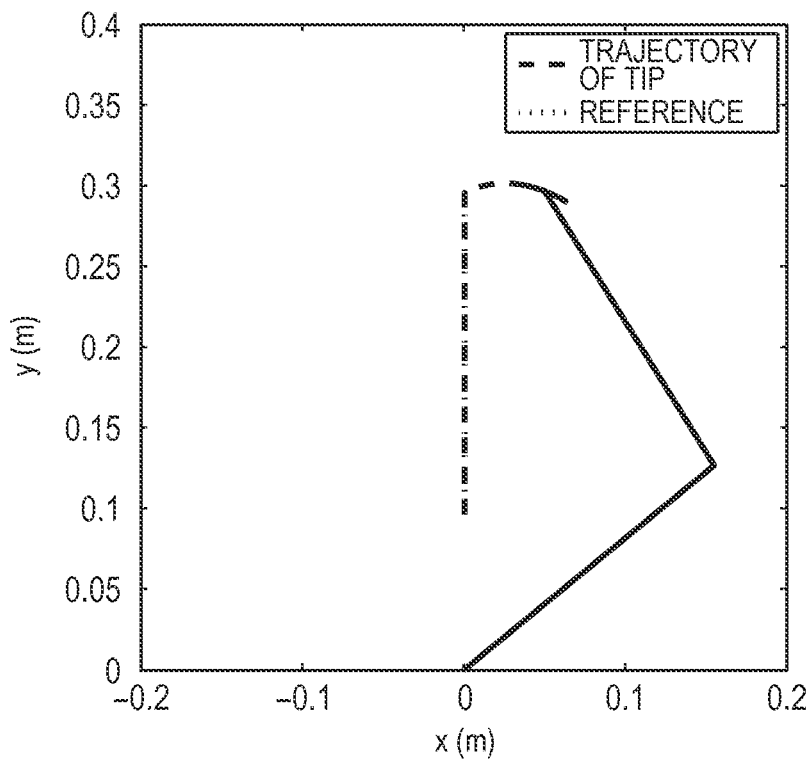
FIGS. 11A and 11B are graphs showing the results of a simulation according to the first embodiment.
Figure 11B:
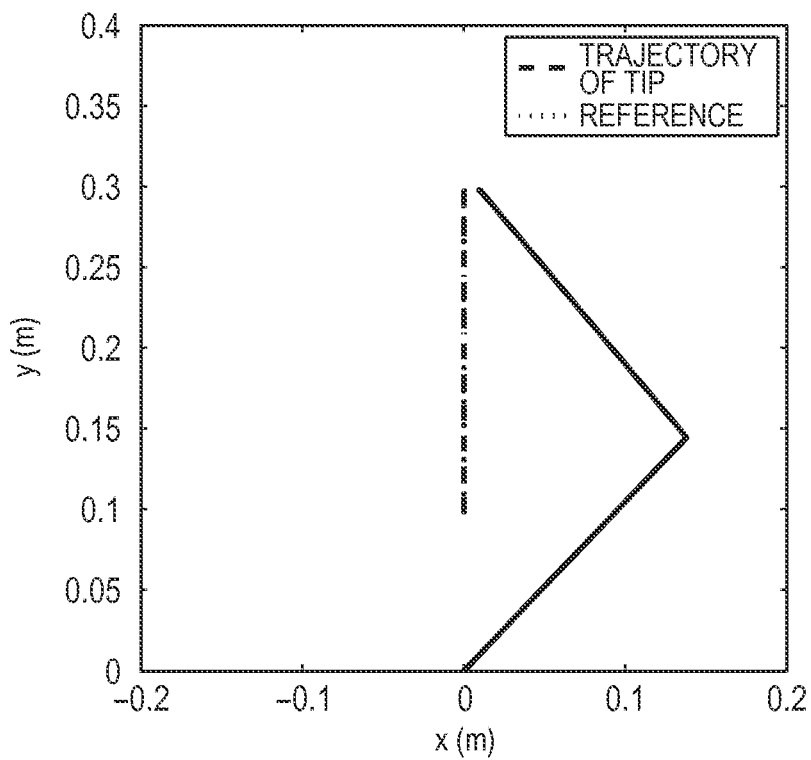

Further, FIG. 11A shows a response of a simulation for applying the disturbance in the positive x-direction to the hand tip E after the target angle is stabilized. A final posture of the manipulator 120 is indicated by the solid line, the trajectory of the hand tip E is indicated by the broken line, and the target trajectory is indicated by the dotted line. While the contact is maintained, the contact gains $G_{t1}$ and $G_{t2}$ are set to zero. When the contact gains are set to zero as a result of the occurrence of the contact, the stiffness of the hand tip E of the manipulator is controlled by the elastic elements of the artificial muscle actuators. In the 3-muscles arrangement, the axes of the stiffness ellipses of the hand tip E become parallel to the x-axis direction and the y-axis direction on the y axis. Therefore, it is understood that the hand tip E exhibits flexibility in the direction parallel to the x axis against the disturbance in the positive x-axis direction. For comparison, FIG. 11B shows a response expressed by:

$$U_{3max}=15, U_{3min}=5$$

It is understood that the hand tip E tracks the target trajectory as in the case of FIG. 11A and the manipulator 120 has a high stiffness against the disturbance to the hand tip E. It is also understood the following. By the two-degrees-of-freedom control system of this embodiment, even when the model has the identification error, the stiffness of the manipulator 120 (hand tip E) can be varied while the tracking to the target trajectory is realized.

(Second Embodiment)

Next, a robotics apparatus according to a second embodiment of the present invention is described. In the first embodiment described above, the case where the actuators $f_1$, $f_2$, and $e_3$ generate only the contractile forces (tensile forces) as the driving forces has been described. Specifically, in the first embodiment described above, the two-degrees-of-freedom control system taking the antagonistic drive into consideration is derived, and the trajectory tracking control is performed simultaneously with the hand tip stiffness control. The antagonistic drive has an advantage in that a backlash of the mechanism constituting the manipulator can be compensated for. For a McKibben artificial muscle which is one type of the artificial muscle actuators, however, a valve is required to be opened and closed to control an air pressure. Therefore, it is known that it is difficult to obtain a high responsiveness from the McKibben artificial muscle.

Therefore, the use of a variable stiffness actuator using an electromagnetic motor as a force-generating element and the combination of mechanical elements such as a spring and a damper to variably change a viscoelasticity as in the case of the artificial muscle actuator is actually studied. The variable stiffness actuator (VSA) has a feature in that an output direction of the force is not limited to the contraction direction.

In the second embodiments, the VSAs are used as the actuators $f_1$, $f_2$, and $e_3$ which are a first driving source, a second driving source, and a third driving source. Then, a control system which performs non-antagonistic drive using pushing forces of the VSAs in a time zone in which a large output is required, for example, at time of acceleration/deceleration, and performs antagonistic drive in a time zone in which a backlash is required to be compensated for at the time of stabilization is designed. As a result, as compared with the first embodiment, stabilization time can be reduced. Specifically, in the second embodiment, the case where the actuators $f_1$, $f_2$, and $e_3$ generate the contractile forces (tensile forces) and pushing forces as the driving forces is described. The arrangement of the actuators $f_1$, $f_2$, and $e_3$ is the same as that of the first embodiment (FIG. 1) described above, and therefore the description thereof is herein omitted.

(1) Modeling

In the second embodiment, the realization of the viscoelastic property of the muscle is considered, which is expressed by Formula (1) by employing the parallel-type VSAs using the combination of the mechanism such as the electromagnetic motor and the spring as the artificial muscle actuators $f_1$, $f_2$, and $e_3$. In the second embodiment, the electromagnetic motor is used as the force-generating element. In this case, each of the drivers 301, 302, and 303 (FIG. 2) is configured by electric circuits for supplying a current to the electromagnetic motors in accordance with the driving-force command values from the control device to drive the actuators $f_1$, $f_2$, and $e_3$. The elastic element can realize the variable stiffness by using a spring, a mechanism for variably changing a spring length, and a second actuator for driving the mechanism. The viscous element can realizes the variable viscosity by using a semi-active damper using a variable orifice.

The second embodiment using the VSAs differs from the first embodiment described above in that the pushing force can be generated without limiting the output direction of the force to the contraction direction. Motion equations of the two-link manipulator are Formulas (2) and (3) as in the case of the first embodiment.

(2) Control System Design (2.1) Two-Degrees-of-Freedom Control System

Figure 12:
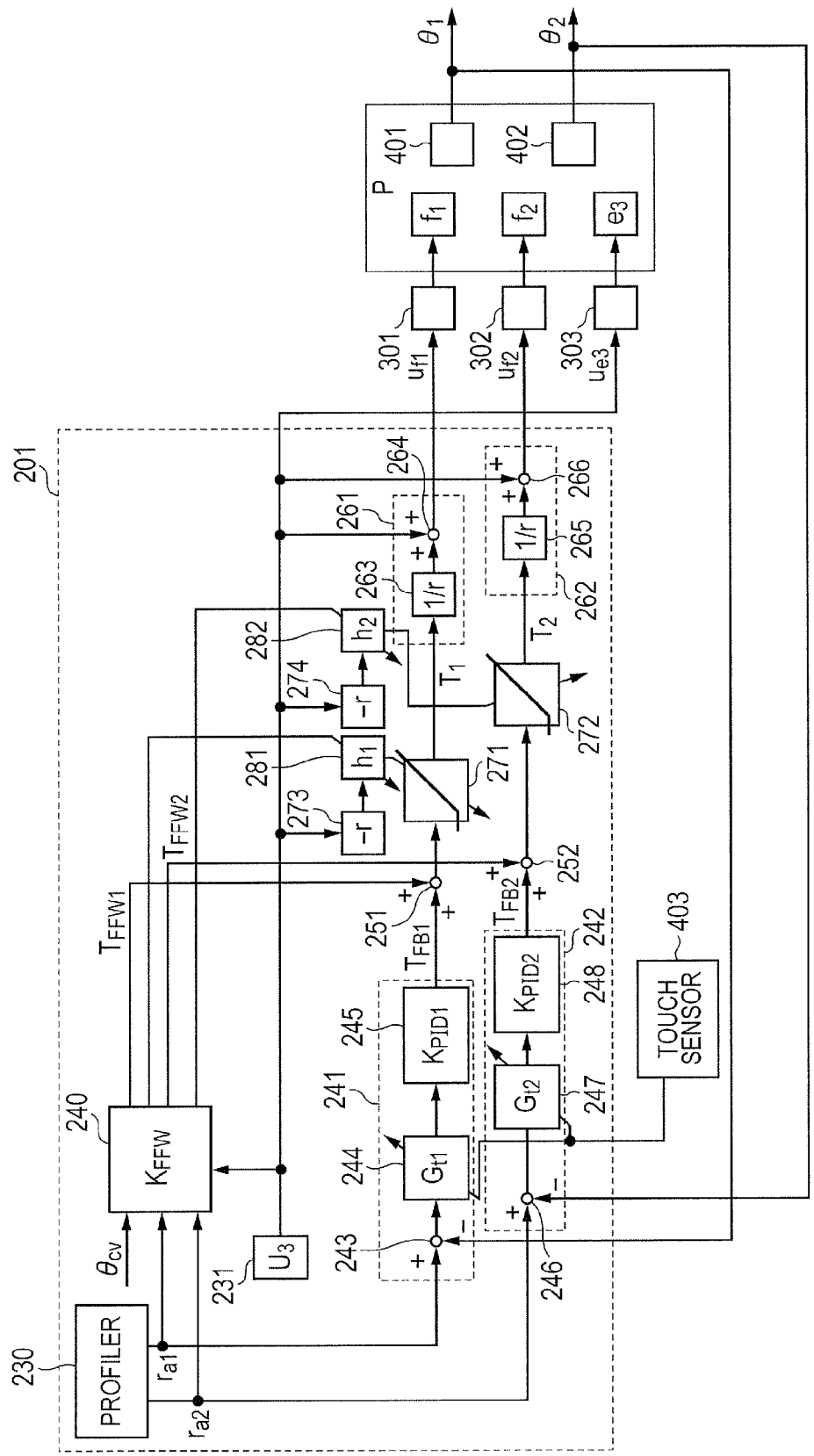
FIG. 12 is a functional block diagram illustrating a control operation of a CPU according to a second embodiment of the present invention.

FIG. 12 is a functional block diagram for illustrating a control operation of the CPU (control unit) according to the second embodiment. A device configuration of the control device is the same as that of FIG. 3, which is described in the first embodiment, but the contents of the program 221 are different. Specifically, the control operation of the CPU 201 which is the control unit is different. The CPU 201 functions not only as the units described in the first embodiment referred to FIG. 4 but also as a coefficient setting processing unit 281 for performing first coefficient setting processing for setting a first coefficient $h_1$ and a coefficient setting processing unit 282 for performing second coefficient setting processing for setting a second coefficient $h_2$.

In the first embodiment, the condition for allowing the artificial muscle actuators perform the antagonistic drive for generating the forces only in the contraction direction has been described. For performing the non-antagonistic drive for allowing the artificial muscle actuators to generate the pushing forces, Formula (10) needs to be dissatisfied. This is because the condition for allowing the artificial muscle actuators to generate the forces only in the contraction direction, which is expressed by Formula (9), is not satisfied as a result of the dissatisfaction of Formula (10). Therefore, in the second embodiment, the first coefficient $h_1$ for adjusting an antagonistic degree to the link 101 and the second coefficient $h_2$ for adjusting an antagonistic degree to the link 102 are introduced to modify Formula (10) as:

$$T_1 > -rh_2 U_3, \quad T_2 > -rh_2 U_3 \quad (23)$$

Specifically, $T_1 > -r \times h_1 \times U_3$ is set as the first constraint condition, and $T_2 > -r \times h_2 \times U_3$ is set as the second constraint condition. Here, by setting $h_1=1$ and $h_2=1$, Formula (23) becomes equal to Formula (10). Therefore, the antagonistic drive is performed. On the other hand, by setting $h_1 \gg 1$ and $h_2 \gg 1$, the non-antagonistic drive is performed.

Further, by smoothly changing the parameters $h_1$ and $h_2$, a transition from the antagonistic drive to the non-antagonistic drive can be achieved seamlessly. For the satisfaction of Formula (23), the sums of the feedback control inputs and the feedforward control inputs only need to be constrained, as illustrated in a block diagram of FIG. 12.

The coefficient setting processing unit 281 sets the first coefficient $h_1$ to 1 when a pivot direction of the link 101 by the actuator $f_1$ and a pivot direction of the link 101 by the actuator $e_3$ are opposite to each other. On the other hand, the coefficient setting processing unit 281 sets the first coefficient $h_1$ to a value larger than 1 when the pivot direction of the link 101 by the actuator $f_1$ and the pivot direction of the link 101 by the actuator $e_3$ are the same.

Similarly, the coefficient setting processing unit 282 sets the second coefficient $h_2$ to 1 when a pivot direction of the link 102 by the actuator $f_2$ and a pivot direction of the link 102 by the actuator $e_3$ are opposite to each other. On the other hand, the coefficient setting processing unit 282 sets the second coefficient $h_2$ to a value larger than 1 when the pivot direction of the link 102 by the actuator $f_2$ and the pivot direction of the link 102 by the actuator $e_3$ are the same.

When the torque command value $T_1$ does not satisfy the first constraint condition described above, the constraint processing unit 271 corrects the torque command value $T_1$ so as to satisfy the first constraint condition and sets the result of correction as the new torque command value $T_1$.

Similarly, when the torque command value $T_2$ does not satisfy the second constraint condition described above, the constraint processing unit 272 corrects the torque command value $T_2$ so as to satisfy the second constraint condition and sets the result of correction as the new torque command value $T_2$.

(2.2) Feedforward Control Systems

In the first embodiment described above, when any one of the feedforward control inputs (temporary first driving-force command value and temporary second driving-force command value) $u_{Ff1}$ and $u_{Ff2}$ becomes negative, the antagonistic drive is not performed. Therefore, $U_3$ is set again in such a case.

In the second embodiment, when any one of the feedforward control inputs $u_{Ff1}$ and $u_{Ff2}$ becomes negative, the force-generating elements of the VSAs generate the pushing forces. In this case, the viscoelastic coefficient becomes negative in the viscoelasticity model of the muscle based on Formula (1). However, the negative viscoelasticity is difficult to realize with a mechanical system. Therefore, in a section in which the generated force becomes negative, a viscoelastic coefficient of the parallel VSAs is set to 0. As a result, in a section in which $u_{Ff1} < 0$, a recalculation is performed by replacing Formula (15) as:

$$u_{Ff1} = \frac{f_1(r_{a1}, \dot{r}_{a1}, \ddot{r}_{a1}, r_{a2}, \dot{r}_{a2}, \ddot{r}_{a2}) + U_3 r(1 + kr((r_{a1} - \theta_{c1}) + (r_{a2} - \theta_{c2})) + br(\dot{r}_{a1} + \dot{r}_{a2}))}{r} \quad (24)$$

In a section in which $u_{Ff2} < 0$, a recalculation is performed by replacing Formula (16) as:

$$u_{Ff2} = \frac{f_2(r_{a1}, \dot{r}_{a1}, \ddot{r}_{a1}, r_{a2}, \dot{r}_{a2}, \ddot{r}_{a2}) + U_3 r(1 + kr((r_{a1} - \theta_{c1}) + (r_{a2} - \theta_{c2})) + br(\dot{r}_{a1} + \dot{r}_{a2}))}{r} \quad (25)$$

By substituting Formulas (15) and (16) into Formulas (6) and (7), the feedforward control torques $T_{FFW1}$ and $T_{FFW2}$ are obtained.

(2.3) Generation of Parameters for Adjusting Antagonistic Degree

In a section in which any one of the feedforward control inputs $u_{Ff1}$ and $u_{Ff2}$ becomes negative, the feedforward control with the non-antagonistic drive is performed. Thus, the condition of the antagonistic drive can be cancelled for the feedback control systems. Therefore, in the second embodiment, a parameter $h_n$ (n=1, 2) for adjusting the antagonistic degree is automatically generated by setting as $h_n=1$ in a section in which the feedforward control input $u_{Ffn}$ (n=1, 2) becomes positive and by setting as $h_n=10$ in a section in which the feedforward control input $u_{Ffn}$ becomes negative. In this case, if $h_n$ is discontinuously switched between $h_n=1$ and $h_n=10$, such discontinuous switching becomes a factor of chattering in the control inputs at the time of the transition between the antagonistic drive and the non-antagonistic drive. Therefore, the generated parameter $h_n$ is controlled to pass through a zero-phase lowpass filter in advance.

(3) Simulation

A simulation using the control system described in the preceding section is performed. Although the positioning finish time $t_{fin}=0.75$ [seconds] is set in the first embodiment described above, the positioning finish time $t_{fin}=0.64$ [seconds] is set in the second embodiment. The other conditions are the same as those of the simulation of the first embodiment described above.

Figure 13A:
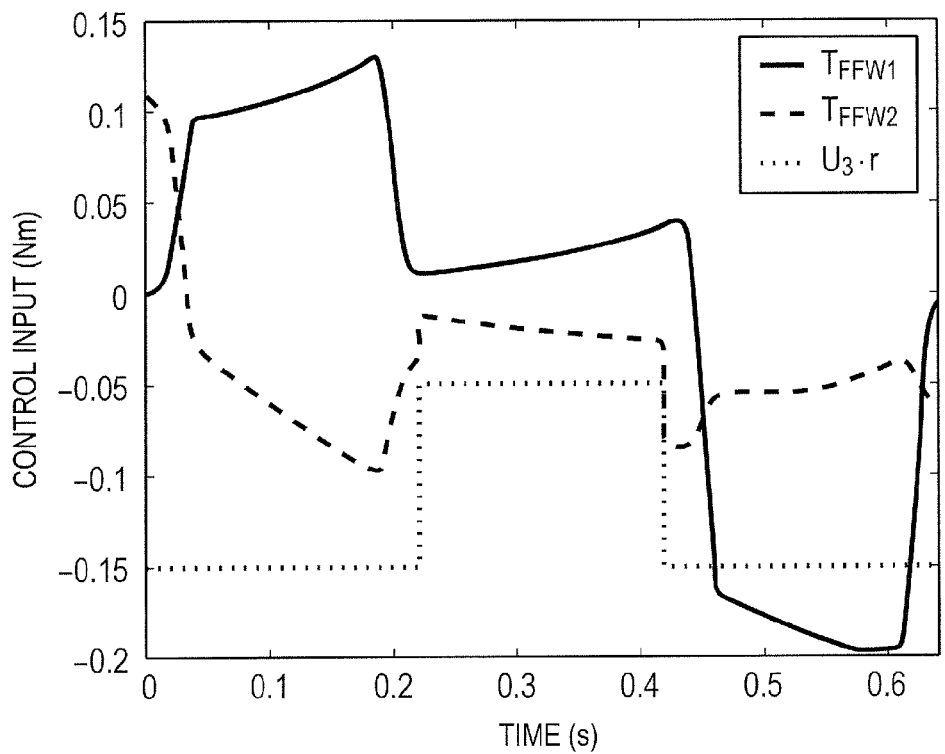
FIGS. 13A and 13B are graphs showing the results of a simulation according to the second embodiment.

FIG. 13A shows the feedforward control torque $T_{FFW1}$ to the link 101 in solid line and the feedforward control torque $T_{FFW2}$ to the link 102 in broken line, which are derived by the procedure described in the section (2. 2) from the target trajectory $r_a$, and a product of the muscle command $U_3$ and the moment arm r in dotted line.

In the second embodiment, because the positioning finish time is reduced, a large acceleration/deceleration force is required. Thus, the condition expressed by Formula (10) does not satisfied a condition in a section from about 0.45 [seconds] to 0.62 [seconds] for the link 101. Thus, the non-antagonistic drive is required for the link 101.

Figure 13B:
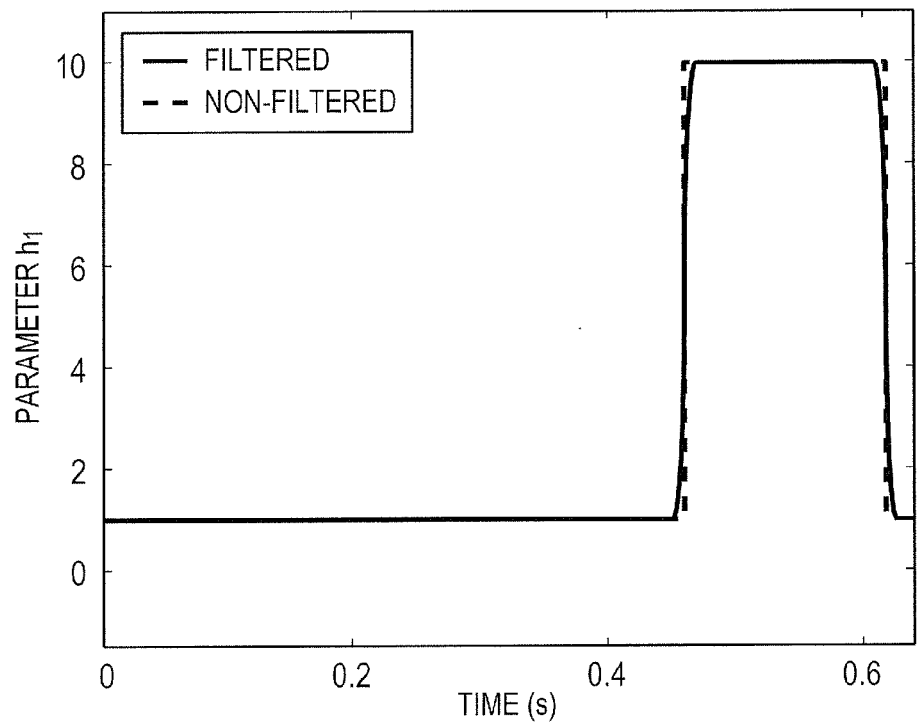

The parameter h for adjusting the antagonistic degree is shown in FIG. 13B. In the second embodiment, in the case of the non-antagonistic drive, h=10 is set. As indicated by the broken line, the parameter is first generated, and in addition in order to avoid abrupt switching, the zero-phase lowpass filter is used.

The filtered parameter h is indicated by the solid line. As a result, the feedforward inputs for performing an efficient deceleration by the non-antagonistic drive in the deceleration section and allowing a seamless transition to the antagonistic drive in the stabilization section to compensate for the backlash of the mechanism are generated.

Figure 14A:
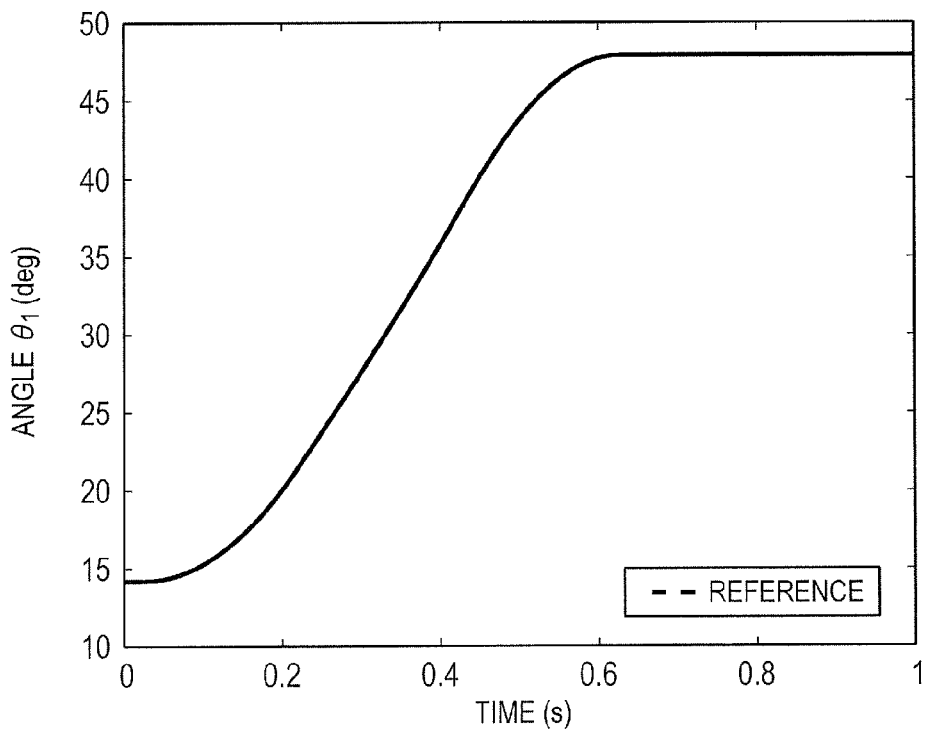
FIGS. 14A and 14B are graphs showing the results of a simulation according to the second embodiment.
Figure 14B:
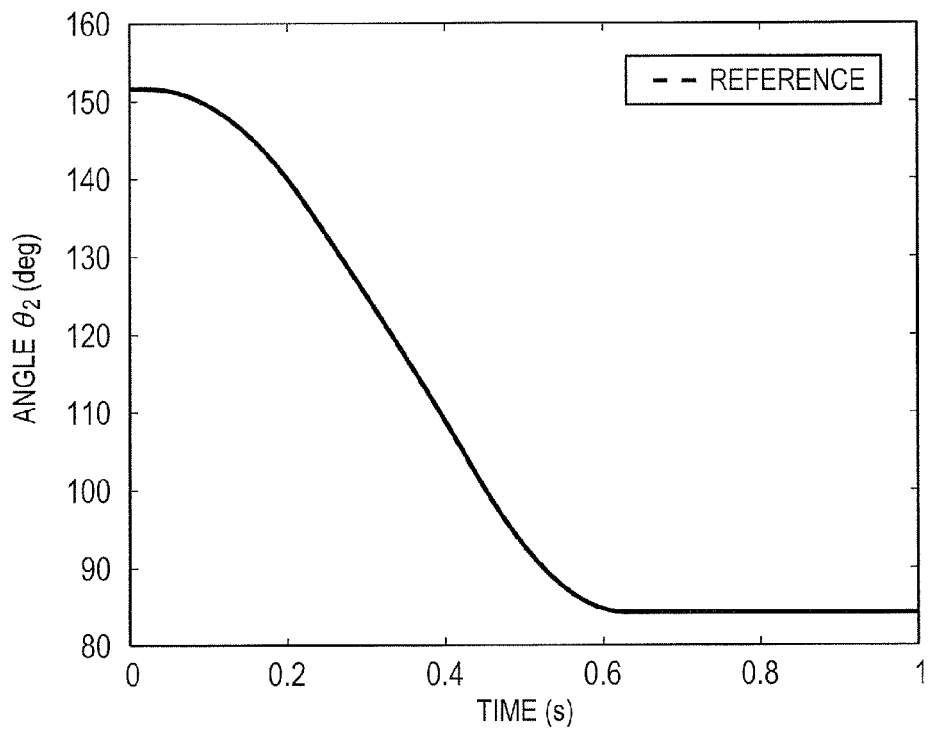
Figure 15:
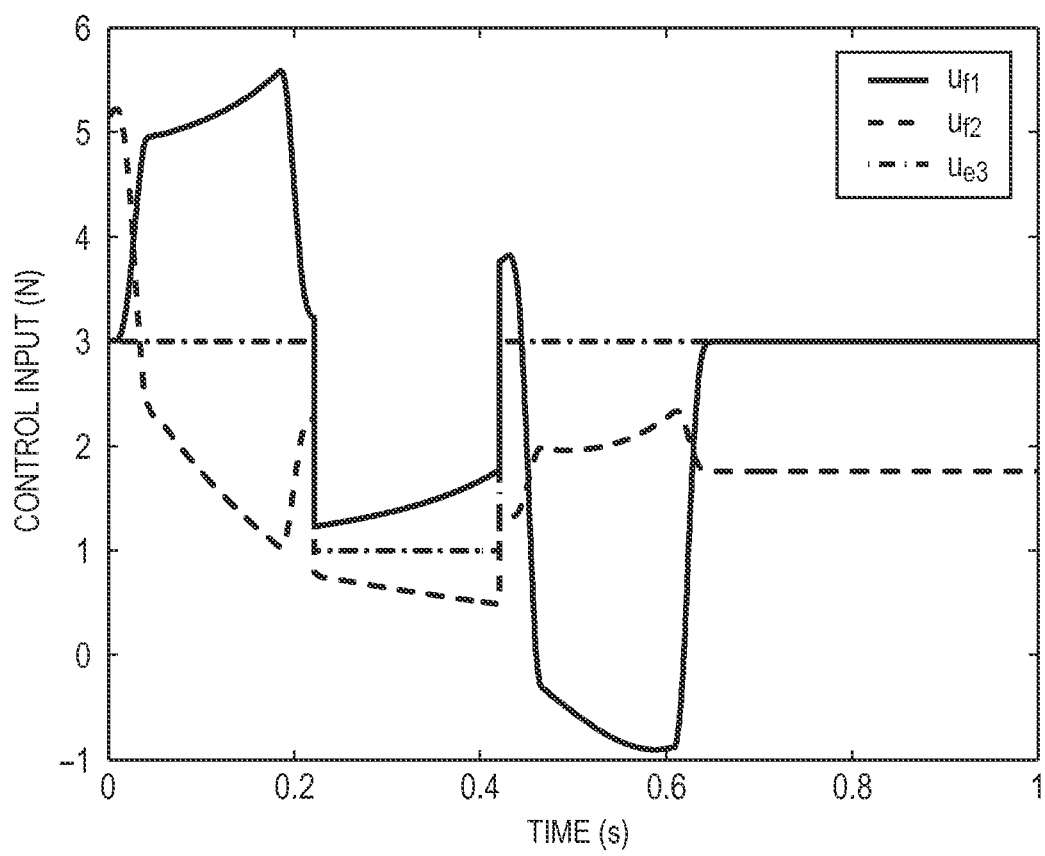
FIG. 15 is a graph showing the result of a simulation according to the second embodiment.

FIG. 14A shows the detected joint angle $\theta_1$ of the link 101 in solid line and the target joint angle $r_{a1}$ in broken line, whereas FIG. 14B shows the detected joint angle $\theta_2$ of the link 102 in solid line and the target joint angle $r_{a2}$ in broken line. FIG. 15 shows responses to the driving-force command values $u_{f1}$, $u_{f2}$, and $u_{e3}$ respectively in solid line, broken line, and alternate long and short dash line.

FIGS. 14A and 14B show that the detected joint angles $\theta_1$ and $\theta_2$ indicated by the solid line overlap the target joint angles $r_{a1}$ and $r_{a2}$ indicated by the broken line. It is understood the links 101 and 102 respectively track the target trajectories even after the transition from the non-antagonistic drive to the antagonistic drive.

FIG. 15 shows that the driving-force command value $u_{f2}$ of the actuator $f_2$, which is indicated by the broken line, constantly has a positive value. However, the driving-force command value $u_{f1}$ indicated by the solid line has a negative value in the section in which the parameter $h_1$ for adjusting the antagonistic degree shown in FIG. 13B is equal to or larger than 1.

By the above-mentioned fact, it is understood that the driving-force command value $u_{f1}$ generates the pushing force to perform the non-antagonistic drive. After 0.62 [seconds] at which the parameter h becomes 1, the non-antagonistic drive transitions to the antagonistic drive. As a result, all the actuators $f_1$, $f_2$, and $e_3$ generate the contractile force. By the antagonistic drive, the backlash of the mechanism is compensated for. Therefore, the links 101 and 102 can be positioned at the target joint angles $r_{a1}$ and $r_{a2}$ with high accuracy.

The present invention is not limited to the embodiments described above. Various variations are possible by a person having ordinary skill in the art within the scope of the technical idea of the present invention.

Specifically, each of the processing operations of the embodiments described above is executed by the CPU 201 which is the control unit of the control device 200. Therefore, the recording medium on which the program for realizing the above-mentioned functions is recorded may be supplied to the control device 200 so that each of the processing operations is achieved by reading and executing the programs stored in the recording medium by the computer (CPU or MPU) of the control device 200. In this case, the program itself read out from the recording medium realizes the functions of the embodiments described above. Thus, the program itself and the recording medium on which the program is recorded constitute the present invention.

In the embodiments described above, the case where the computer-readable recording medium is the HDD 204 and the program 221 is stored in the HDD 204 has been described. However, the recording medium for storing the program is not limited thereto. The program 221 may be recorded on any recording medium as long as the recording medium is computer-readable. For example, as the recording medium for supplying the program, the ROM 202 and the recording disk 222, which are illustrated in FIG. 3, and an external storage device (not shown) may be used. As specific examples, a flexible disk, a hard disk, an optical disc, a magneto-optical disc, a CD-ROM, a CD-R, a magnetic tape, a rewritable non-volatile memory (USB memory, for example), and a ROM can be used as the recording medium.

The program described in the embodiments described above may be downloaded through a network to be executed by a computer.

Further, the present invention is not limited to the realization of the functions in the embodiments described above by executing the program codes read out by the computer. The present invention encompasses the case where an operating system (OS) operating on the computer executes a part or all of the actual processing based on an instruction of the program code to realize the functions of the embodiments described above by the processing.

Further, the program code read out from the recording medium may be written on a memory included in an extension board inserted into the computer or an extension unit connected to the computer. The present invention encompasses the case where the CPU included in the extension board or the extension unit performs a part or all of the actual processing based on an instruction of the program code to realize the functions of the embodiments described above by the processing.

Further, although the case where the functions illustrated in FIG. 4 or FIG. 12 are performed by executing the program recorded in the recording medium such as the HDD by the computer has been described in the embodiments described above, the present invention is not limited thereto. At least a part or all of the functions of the control unit illustrated in FIG. 4 or FIG. 12 may be configured by a dedicated LSI such as an ASIC or an FPGA. The ASIC is an abbreviation with the capital letters of Application Specific Integrated Circuit, and the FPGA is an abbreviation with the capital letters of Field-Programmable Gate Array.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-061607, filed Mar. 25, 2013, which is hereby incorporated by reference herein in its entirety.

What is claimed is:

1. A robotics apparatus, comprising:
a first link pivotably connected at a first joint with regard to a base portion;
a second link pivotably connected at a second joint with regard to the first link;
a first driving source configured to drive the first link about the first joint;
a second driving source configured to drive the second link about the second joint;
a third driving source configured to simultaneously drive the first link about the first joint and the second link about the second joint; and
a control unit configured to respectively control driving forces of the first driving source, a driving force of the second driving source and a driving force of the third driving source, based on a first driving-force command value for the first driving source, a second driving-force command value for the second driving source, and a third driving-force command value for the third driving source,
wherein the control unit executes:
target joint-angle generation processing for generating a first target joint angle for the first joint and a second target joint angle for the second joint based on a target trajectory of a distal end of the second link;
setting processing for setting the third driving-force command value to a predetermined setting value;
first driving-force command value calculation processing for calculating the first driving-force command value based on the third driving-force command value and the first target joint angle; and
second driving-force command value calculation processing for calculating the second driving-force command value based on the third driving-force command value and the second target joint angle.

2. The robotics apparatus according to claim 1, further comprising:
a first detection unit configured to detect a joint angle of the first joint as a first detected joint angle; and
a second detection unit configured to detect a joint angle of the second joint as a second detected joint angle,
wherein the control unit executes:
first feedforward calculation processing for obtaining a temporary first torque command value for the first joint by a feedforward calculation by using the third driving-force command value and the first target joint angle;
second feedforward calculation processing for obtaining a temporary second torque command value for the second joint by a feedforward calculation by using the third driving-force command value and the second target joint angle;
first feedback calculation processing for obtaining a first correction torque command value for the first joint by a feedback calculation based on a difference between the first detected joint angle and the first target joint angle;
second feedback calculation processing for obtaining a second correction torque command value for the second joint by a feedback calculation based on a difference between the second detected joint angle and the second target joint angle;
first torque command value calculation processing for obtaining a first torque command value for the first joint by adding the first correction torque command value to the temporary first torque command value; and
second torque command value calculation processing for obtaining a second torque command value for the second joint by adding the second correction torque command value to the temporary second torque command value,
wherein the first driving-force command value calculation processing calculates the first driving-force command value based on the third driving-force command value and the first torque command value, and
wherein the second driving-force command value calculation processing calculates the second driving-force command value based on the third driving-force command value and the second torque command value.

3. The robotics apparatus according to claim 2, wherein the control unit calculates T1/r+U3 as the first driving-force command value in the first driving-force command value calculation processing and calculates T2/r+U3 as the second driving-force command value in the second driving-force command value calculation processing, where T1 represents the first torque command value, T2 represents the second command value, U3 represents a set value of the third driving-force command value, and r represents a moment arm diameter of the first link and the second link.

4. The robotics apparatus according to claim 3,
wherein the first driving source drives the first link about the first joint in a first pivot direction,
wherein the second driving source drives the first link about the second joint in the first pivot direction,
wherein the third driving source drives both the first link and the second link respectively about the first joint and the second joint in a second pivot direction opposite to the first pivot direction, and
wherein the control unit executes:
first constraint processing, in a case where the first torque command value does not satisfy T1>-r×U3 as a first constraint condition, for correcting the first torque command value so that the first torque command value satisfies the first constraint condition and setting a result of the correction as the new first torque command value; and
second constraint processing, in a case where the second torque command value does not satisfy T2>-r×U3 as a second constraint condition, for correcting the second torque command value so that the second torque command value satisfies the second constraint condition and setting a result of the correction as the new second torque command value.

5. The robotics apparatus according to claim 3,
wherein in the first feedforward calculation processing, the control unit calculates a temporary first driving-force command value by a calculation based on inverse dynamics and calculates the temporary first torque command value TFFW1 by TFFW1=(uFf1−U3)×r, where uFf1 represents the temporary first driving-force command value, and
wherein in the second feedforward calculation processing, the control unit calculates a temporary second driving-force command value by a calculation based on inverse dynamics in the second feedforward calculation processing and calculates the temporary second torque command value TFFW2 by TFFW2=(uFf2−U3)×r, where uFf2 represents the temporary second driving-force command value.

6. The robotics apparatus according to claim 5, wherein when at least one of the temporary first driving-force command value or the temporary second driving-force command value is a negative value, the control unit adds a positive value to the set value of the third driving-force command value and executes the first feedforward calculation processing and the second feedforward calculation processing again.

7. The robotics apparatus according to claim 3, wherein the control unit executes:
first-coefficient setting processing for setting the first coefficient to 1 in a case where a pivot direction of the first link by the first driving source and a pivot direction of the first link by the third driving source are opposite to each other, and for setting the first coefficient to a value larger than 1 when the pivot direction of the first link by the first driving source and the pivot direction of the first link by the third driving source are the same;
second-coefficient setting processing for setting the second coefficient to 1 when a pivot direction of the second link by the second driving source and a pivot direction of the second link by the third driving source are opposite to each other, and for setting the second coefficient to a value larger than 1 when the pivot direction of the second link by the second driving source and the pivot direction of the second link by the third driving source are the same;
first constraint processing for correcting the first torque command value so that the first torque command value satisfies the first constraint condition when the first torque command value does not satisfy T1>-r×h1×U3 as a first constraint condition and setting a result of the correction as the new first torque command value, where h1 represents a first coefficient; and
second constraint processing for correcting the second torque command value so that the second torque command value satisfies the second constraint condition when the second torque command value does not satisfy T2>-r×h2×U3 as a second constraint condition and setting a result of the correction as the new second torque command value, where h2 represents a second coefficient.

8. The robotics apparatus according to claim 7,
wherein in the first feedforward calculation processing, the control unit calculates a temporary first driving-force command value by a calculation based on inverse dynamics and calculates the temporary first torque command value TFFW1 by TFFW1=(uFf1−U3)×r, where uFf1 represents the temporary first driving-force command value, and
wherein in the second feedforward calculation processing, the control unit calculates a temporary second driving-force command value by a calculation based on inverse dynamics in the second feedforward calculation processing and calculates the temporary second torque command value TFFW2 by TFFW2=(uFf2−U3)×r, where uFf2 represents the temporary second driving-force command value.

9. The robotics apparatus according to claim 8,
wherein in the first feedforward calculation processing, in a case where uFf1<0 holds, the control unit sets a viscoelastic coefficient of the first driving source is to 0 and recalculates the temporary first driving-source command value based on the inverse dynamics, and
wherein in the second feedforward calculation processing, in a case where uFf2<0 holds, the control unit sets a viscoelastic coefficient of the second driving source to 0 and recalculates the temporary second driving-source command value based on the inverse dynamics.

10. The robotics apparatus according to claim 2, further comprising a touch sensor for detecting whether or not an object has come into contact with one of the first link and the second link,
wherein in a case where the touch sensor determines the contact of the object with the one of the first link and the second link, the control unit sets the first correction torque command value to 0 in the first feedback calculation processing and sets the second correction torque command value to 0 in the second feedback calculation processing.

11. The robotics apparatus according to claim 1, wherein the first driving source, the second driving source, and the third driving source include pneumatic artificial muscle actuators.

12. A robot control method of controlling a robotics apparatus, wherein the robotics apparatus comprises:
a first link pivotably connected at a first joint with regard to a base portion;
a second link pivotably connected at a second joint with regard to the first link;

a first driving source configured to drive the first link about the first joint;
a second driving source configured to drive the second link about the second joint;
a third driving source configured to simultaneously drive the first link about the first joint and the second link about the second joint; and
a control unit configured to respectively control driving forces of the first driving source, a driving force of the second driving source and a driving force of the third driving source, based on a first driving-force command value for the first driving source, a second driving-force command value for the second driving source, and a third driving-force command value for the third driving source,
wherein the robot control method comprises:
generating, by the control unit, a first target joint angle for the first joint and a second target joint angle for the second joint based on a target trajectory of a distal end of the second link;
setting, by the control unit, the third driving-force command value to a predetermined setting value;
calculating, by the control unit, the first driving-force command value based on the third driving-force command value and the first target joint angle; and
calculating, by the control unit, the second driving-force command value based on the third driving-force command value and the second target joint angle.

13. The robot control method according to claim 12, wherein the robotics apparatus further comprises:
a first detection unit configured to detect a joint angle of the first joint as a first detected joint angle; and
a second detection unit configured to detect a joint angle of the second joint as a second detected joint angle,
wherein the robot control method further comprises a first feedforward calculation step of obtaining, by the control unit, a temporary first torque command value for the first joint by a feedforward calculation by using the third driving-force command value and the first target joint angle;
a second feedforward calculation step of obtaining, by the control unit, a temporary second torque command value for the second joint by a feedforward calculation by using the third driving-force command value and the second target joint angle;
a first feedback calculation step of obtaining, by the control unit, a first correction torque command value for the first joint by a feedback calculation based on a difference between the first detected joint angle and the first target joint angle;
a second feedback calculation step of obtaining, by the control unit, a second correction torque command value for the second joint by a feedback calculation based on a difference between the second detected joint angle and the second target joint angle;
a first torque command value calculation step of obtaining, by the control unit, a first torque command value for the first joint by adding the first correction torque command value to the temporary first torque command value; and
a second torque command value calculation step of obtaining, by the control unit, a second torque command value for the second joint by adding the second correction torque command value to the temporary second torque command value,
wherein the first driving-force command value calculation step comprises calculating, by the control unit, the first driving-force command value based on the third driving-force command value and the first torque command value, and
wherein the second driving-force command value calculation step comprises calculating, by the control unit, the second driving-force command value based on the third driving-force command value and the second torque command value.

14. A non-transitory computer-readable recording medium comprising a computer program executable on a computer for controlling a robotics apparatus,
wherein the robotics apparatus comprises:
a first link pivotably connected at a first joint with regard to a base portion;
a second link pivotably connected at a second joint with regard to the first link;
a first driving source configured to drive the first link about the first joint;
a second driving source configured to drive the second link about the second joint;
a third driving source configured to simultaneously drive the first link about the first joint and the second link about the second joint; and
a control unit configured to respectively control driving forces of the first driving source, a driving force of the second driving source and a driving force of the third driving source, based on a first driving-force command value for the first driving source, a second driving-force command value for the second driving source, and a third driving-force command value for the third driving source,
wherein the computer program executes:
generating, by the control unit, a first target joint angle for the first joint and a second target joint angle for the second joint based on a target trajectory of a distal end of the second link;
setting, by the control unit, the third driving-force command value to a predetermined setting value;
calculating, by the control unit, the first driving-force command value based on the third driving-force command value and the first target joint angle; and
calculating, by the control unit, the second driving-force command value based on the third driving-force command value and the second target joint angle.

15. The non-transitory computer-readable recording medium according to claim 14,
wherein the robotics apparatus comprises:
a first detection unit configured to detect a joint angle of the first joint as a first detected joint angle; and
a second detection unit configured to detect a joint angle of the second joint as a second detected joint angle,
wherein the computer program executes:
a first feedforward calculation step of obtaining, by the control unit, a temporary first torque command value for the first joint by a feedforward calculation by using the third driving-force command value and the first target joint angle;
a second feedforward calculation step of obtaining, by the control unit, a temporary second torque command value for the second joint by a feedforward calculation by using the third driving-force command value and the second target joint angle;
a first feedback calculation step of obtaining, by the control unit, a first correction torque command value for the first joint by a feedback calculation based on a difference between the first detected joint angle and the first target joint angle;

a second feedback calculation step of obtaining, by the control unit, a second correction torque command value for the second joint by a feedback calculation based on a difference between the second detected joint angle and the second target joint angle;

a first torque command value calculation step of obtaining, by the control unit, a first torque command value for the first joint by adding the first correction torque command value to the temporary first torque command value; and a second torque command value calculation step of obtaining, by the control unit, a second torque command value for the second joint by adding the second correction torque command value to the temporary second torque command value, wherein the first driving-force command value calculation step comprises calculating, by the control unit, the first driving-force command value based on the third driving-force command value and the first torque command value, and wherein the second driving-force command value calculation step comprises calculating, by the control unit, the second driving-force command value based on the third driving-force command value and the second torque command value.

* * * * *